(12) United States Patent
Gregory

(10) Patent No.: US 11,098,853 B1
(45) Date of Patent: Aug. 24, 2021

(54) PIPELINE SUPPLEMENTAL CONTAINMENT WALL SYSTEMS AND METHODS

(71) Applicant: Trinity Bay Equipment Holdings, LLC, Houston, TX (US)

(72) Inventor: David Michael Gregory, Houston, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

(21) Appl. No.: 16/795,415

(22) Filed: Feb. 19, 2020

(51) Int. Cl.
*F16L 13/14* (2006.01)
*F17D 5/00* (2006.01)
*F17D 1/14* (2006.01)
*F16L 3/10* (2006.01)

(52) U.S. Cl.
CPC .............. *F17D 5/00* (2013.01); *F16L 3/1091* (2013.01); *F16L 13/141* (2013.01); *F17D 1/14* (2013.01)

(58) Field of Classification Search
CPC ........ F16L 39/02; F16L 13/141; F16L 13/161
USPC ......................................... 285/256, 382, 419
See application file for complete search history.

(56) References Cited

U.S. PATENT DOCUMENTS

| | | | | |
|---|---|---|---|---|
| 793,135 A | * | 6/1905 | Kellogg .................. | F16L 21/06 285/373 |
| 1,004,634 A | * | 10/1911 | Dixon ..................... | F16L 27/111 285/114 |
| 3,257,132 A | * | 6/1966 | Lyons ..................... | F16L 33/23 285/253 |
| 3,674,292 A | * | 7/1972 | Demler, Sr. ............ | F16L 13/146 285/256 |
| 3,726,548 A | | 4/1973 | Alewitz | |
| 4,039,212 A | * | 8/1977 | Skarud ................... | F16L 41/021 285/253 |
| 4,139,224 A | * | 2/1979 | Leach ..................... | F16L 33/23 285/253 |

(Continued)

FOREIGN PATENT DOCUMENTS

DE 19922106 A1 * 11/2000 ............ G01M 3/283

OTHER PUBLICATIONS

The International Search Report and Written Opinion for PCT/US2021/018787 dated Apr. 22, 2021.

*Primary Examiner* — David Bochna
(74) *Attorney, Agent, or Firm* — Conrad J. Hsu

(57) ABSTRACT

In one embodiment, a pipeline system includes a pipe fitting to be secured to a pipe segment including tubing that defines a pipe bore and a fluid conduit implemented in a tubing annulus of the tubing, in which the pipe fitting includes a fitting grab notch implemented on an outer surface of the pipe fitting, and a supplemental containment wall assembly to be deployed at the pipe fitting. The supplemental containment wall assembly includes a containment wall shell to be secured circumferentially around the pipe fitting to define a fitting annulus that is sealed at least between the outer surface of the pipe fitting and an inner surface of the containment wall shell to facilitate providing multi-wall containment in the pipeline system and a shell grab tab implemented on the inner surface of the containment wall shell, in which the shell grab tab matingly interlocks with the fitting grab notch on the outer surface of the pipe fitting to facilitate securing the containment wall shell to the pipe fitting.

15 Claims, 8 Drawing Sheets

(56) References Cited

U.S. PATENT DOCUMENTS

| | | | | |
|---|---|---|---|---|
| 4,498,691 A | * | 2/1985 | Cooke | F16L 33/2076 |
| | | | | 285/256 |
| 4,593,942 A | * | 6/1986 | Loker | F16L 33/23 |
| | | | | 285/259 |
| 4,887,646 A | * | 12/1989 | Groves | F16L 55/10 |
| | | | | 138/90 |
| 5,871,239 A | | 2/1999 | Boscaljon et al. | |
| 6,220,302 B1 | * | 4/2001 | Nolley | F16L 55/103 |
| | | | | 138/99 |
| 7,108,292 B2 | * | 9/2006 | Lipscomb | F16L 15/008 |
| | | | | 285/256 |
| 7,722,092 B2 | | 5/2010 | Kim | |
| 8,091,928 B2 | * | 1/2012 | Carrier | F16L 33/2073 |
| | | | | 285/242 |
| 9,027,966 B2 | * | 5/2015 | Altmann | F16L 13/143 |
| | | | | 285/256 |
| 10,139,024 B2 | * | 11/2018 | Hofmann | F16L 13/141 |
| 2003/0001385 A1 | * | 1/2003 | Favre | F16L 13/141 |
| | | | | 285/256 |
| 2007/0216158 A1 | * | 9/2007 | Kertesz | F16L 33/22 |
| | | | | 285/256 |
| 2017/0102102 A1 | * | 4/2017 | Goble | F16L 21/02 |

* cited by examiner

US 11,098,853 B1

PIPELINE SUPPLEMENTAL CONTAINMENT WALL SYSTEMS AND METHODS

BACKGROUND

The present disclosure generally relates to pipeline systems and, more particularly, to a supplemental containment wall assembly that may be deployed at least at a pipe fitting (e.g., connector) in a pipeline system.

Pipeline systems are often implemented and/or operated to facilitate transporting (e.g., conveying) fluid, such as liquid and/or gas, from a fluid source to a fluid destination. For example, a pipeline system may be used to transport one or more hydrocarbons, such as crude oil, petroleum, natural gas, or any combination thereof. Additionally or alternatively, a pipeline system may be used to transport one or more other types of fluid, such as produced water, fresh water, fracturing fluid, flowback fluid, carbon dioxide, or any combination thereof.

To facilitate transporting fluid, a pipeline system may include one or more pipe segments in addition to pipe fittings (e.g., connectors), such as a midline pipe fitting and/or a pipe end fitting. Generally, a pipe segment may include tubing, which defines (e.g., encloses) a bore that provides a primary fluid conveyance (e.g., flow) path through the pipe segment. More specifically, the tubing of a pipe segment may be implemented to facilitate isolating (e.g., insulating) fluid being conveyed within its bore from environmental conditions external to the pipe segment, for example, to reduce the likelihood of the conveyed (e.g., bore) fluid being lost to the external environmental conditions and/or the external environmental conditions contaminating the conveyed fluid.

To facilitate improving fluid isolation provided, in some instances, the tubing of a pipe segment may be implemented to provide multiple (e.g., double) containment walls, for example, at least in part by implementing the pipe segment tubing to include an inner tubing layer and an outer tubing layer separated by a tubing annulus. However, in some instances, at least a portion of a pipe fitting secured to the pipe segment may be considered as providing a single containment wall. Accordingly, at least in such instances, deploying the pipe fitting considered as having a single containment wall in a pipeline system may potentially limit the ability of the pipeline system to provide multi-wall (e.g., double wall) containment.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a pipeline system includes a pipe fitting to be secured to a pipe segment including tubing that defines a pipe bore and a fluid conduit implemented in a tubing annulus of the tubing, in which the pipe fitting includes a fitting grab notch implemented on an outer surface of the pipe fitting, and a supplemental containment wall assembly to be deployed at the pipe fitting. The supplemental containment wall assembly includes a containment wall shell to be secured circumferentially around the pipe fitting to define a fitting annulus that is sealed at least between the outer surface of the pipe fitting and an inner surface of the containment wall shell to facilitate providing multi-wall containment in the pipeline system and a shell grab tab implemented on the inner surface of the containment wall shell, in which the shell grab tab matingly interlocks with the fitting grab notch on the outer surface of the pipe fitting to facilitate securing the containment wall shell to the pipe fitting.

In another embodiment, a method of implementing a pipeline system to provide multi-wall containment includes implementing a supplemental containment wall assembly to be deployed at least at a pipe fitting in the pipeline system, in which the supplemental containment wall assembly includes a containment wall shell and a shell grab tab implemented circumferentially along an inner surface of the containment wall shell, circumferentially covering at least a portion of the pipe fitting using the containment wall shell, in which the portion of the pipe fitting includes a grab ring having a fitting grab notch that runs circumferentially along an outer surface of the pipe fitting, and securing the containment wall shell circumferentially around at least the portion of the pipe fitting at least in part by tightening one or more fasteners of the supplemental containment wall assembly such that the shell grab tab on the inner surface of the containment wall shell matingly interlocks with the fitting grab notch on the outer surface of the pipe fitting and a sealed fitting annulus is defined between at least the inner surface of the containment wall shell and the outer surface of the pipe fitting.

In another embodiment, a supplemental containment wall assembly to be deployed in a pipeline system includes a containment wall shell to be secured circumferentially around at least a pipe fitting in the pipeline system to facilitate defining a fitting annulus at least between an inner surface of the containment wall shell and an outer surface of the pipe fitting, a shell grab tab implemented circumferentially along the inner surface of the containment wall shell, in which the shell grab tab matingly interlocks with a fitting grab notch that runs circumferentially along the outer surface of the pipe fitting to facilitate securing the containment wall shell to the pipe fitting, and one or more containment wall seals implemented circumferentially along the inner surface of the containment wall shell, in which the one or more containment wall seals seal the fitting annulus defined at least between the containment wall shell and the pipe fitting to facilitate providing multi-wall containment at the pipe fitting in the pipeline system.

DETAILED DESCRIPTION

Figure 1:
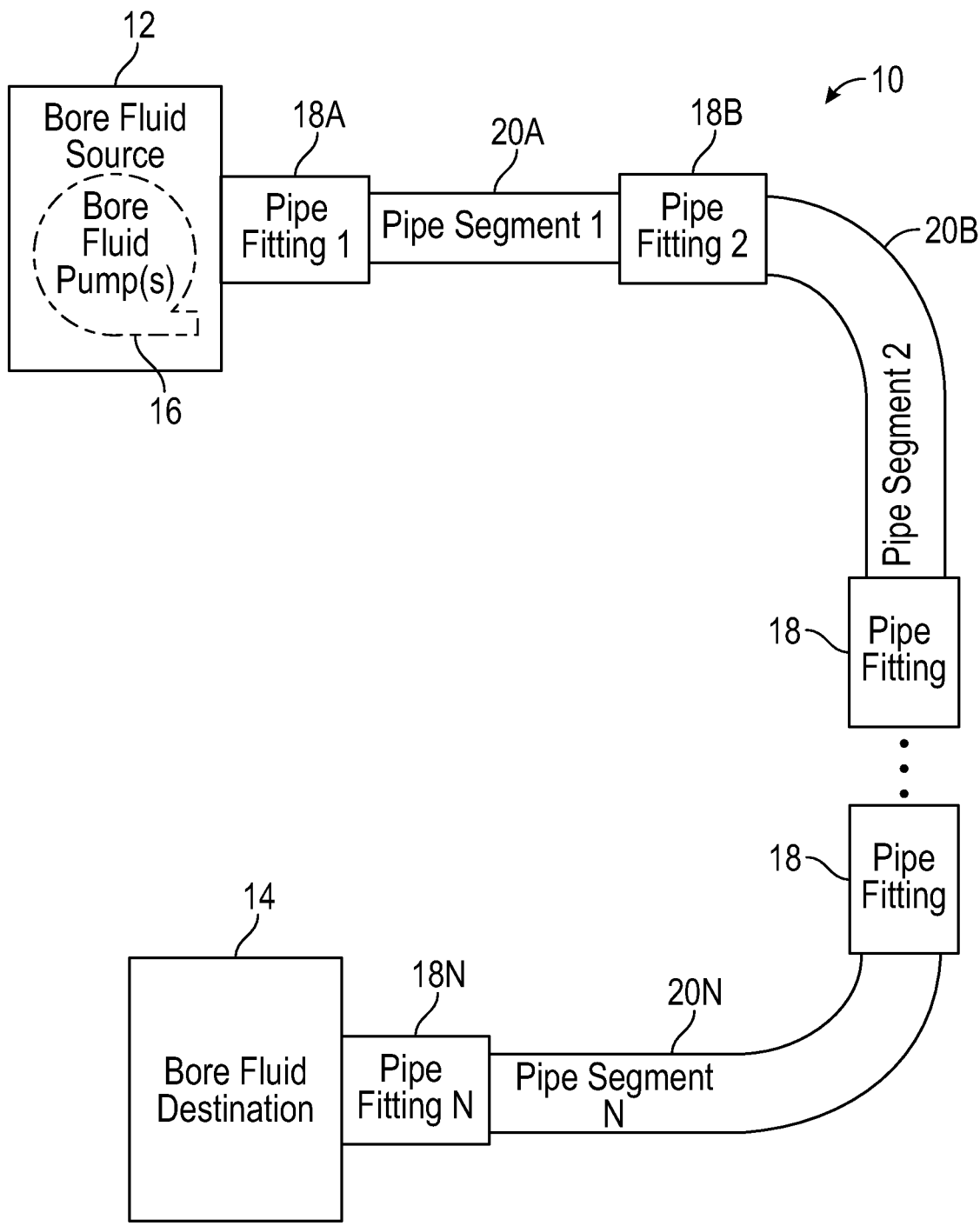
FIG. 1 is a block diagram of an example of a pipeline system including pipe segments and pipe fittings (e.g., connectors), in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features. The figures are not necessarily to scale. In particular, certain features and/or certain views of the figures may be shown exaggerated in scale for purposes of clarification.

The present disclosure generally relates to pipeline systems that may be implemented and/or operated to transport (e.g., convey) fluid, such as liquid and/or gas, from a fluid source to a fluid destination. Generally, a pipeline system may include pipe fittings (e.g., connectors), such as a midline pipe fitting and/or a pipe end fitting, and one or more pipe segments, which each includes tubing that defines (e.g., encloses) a corresponding pipe bore. In particular, a pipe segment may generally be secured and sealed in one or more pipe fittings to facilitate fluidly coupling the pipe segment to another pipe segment, a fluid source, and/or a fluid destination. Merely as an illustrative non-limiting example, a pipeline system may include a first pipe end fitting that couples a first pipe segment to a fluid source, a midline pipe fitting that couples the first pipe segment to a second pipe segment, and a second pipe end fitting that couples the second pipe segment to a fluid destination.

Additionally, in some instances, a pipeline system may be implemented to provide multi-wall (e.g., double wall) containment to facilitate improving fluid isolation provided by the pipeline system. In particular, a portion of the pipeline system may provide multi-wall containment when, moving radially outward, the portion of the pipeline system includes multiple structural layers separated by one or more corresponding annuli. Thus, to facilitate providing multi-wall containment, the tubing of a pipe segment deployed in the pipeline system may include an inner layer and an outer layer separated by a tubing annulus, for example, which is implemented using one or more intermediate layers that each has one or more openings (e.g., fluid conduits) devoid of solid material.

In any case, as described above, a pipe segment may be secured in a pipe fitting. In particular, in some instances, the pipe fitting may be secured to the pipe segment using swaging techniques. To facilitate securing a pipe segment thereto using swaging techniques, the pipe fitting may include a fitting tube, which defines (e.g., encloses) a fitting bore through the pipe fitting, and a fitting jacket, which is coupled around the fitting jacket to define (e.g., enclose) a tubing cavity in which the tubing of the pipe segment is to be secured. Thus, in such instances, the pipe fitting may be secured to a pipe segment at least in part by inserting the tubing of the pipe segment into the tubing cavity and conformally deforming the pipe fitting around the pipe segment tubing. In fact, when pipe segment tubing implemented with multiple containment walls is inserted, at least the portion of the pipe fitting at which the pipe segment tubing is secured may provide multi-wall containment.

To facilitate conformally deforming a pipe fitting around pipe segment tubing, in some instances, deployment equipment, such as a swage machine, may be coupled to the pipe fitting. In particular, to facilitate coupling deployment equipment thereto, the pipe fitting may include a grab ring with a fitting grab notch that runs circumferentially along an outer surface of the grab ring. Additionally, the deployment equipment may include a grab plate with an equipment grab tab, which is implemented (e.g., sized and/or shaped) to matingly interlock (e.g., engage and/or interface) with the fitting grab notch of the pipe fitting.

However, in some instances, a grab ring of a pipe fitting may be coupled to the fitting tube of the pipe fitting such that the grab ring is at least partially external from a fitting jacket of the pipe fitting. In other words, in such instances, at least a portion of the grab ring may not be implemented between the fitting tube and the fitting jacket and, thus, pipe segment tubing may not be present between the fitting tube and the grab ring even when the pipe segment tubing is fully inserted into a tubing cavity defined between the fitting tube and the fitting jacket. Although implemented with multiple layers (e.g., fitting tube and grab ring), in some instances, the portion of the pipe fitting may nevertheless be considered as providing single wall containment, for example, due to the grab ring directly abutting the fitting tube resulting in the lack of an annulus therebetween.

Accordingly, to facilitate providing multi-wall containment in a pipeline system, the present disclosure provides techniques for implementing and/or deploying a supplemental containment wall assembly in the pipeline system, for example, at least at one or more pipe fittings considered as providing single wall containment. In particular, as will be described in more detail below, the supplemental containment wall assembly may include a containment wall shell, which is implemented to be secured and sealed circumferentially around at least a portion of a pipe fitting. Additionally, the supplemental containment wall may include one or more fasteners, which are implemented to facilitate securing the containment wall shell around the pipe fitting. However, as will be described in more detail below, different embodiments of a supplemental containment wall assembly may include different types of containment wall shells and/or different types of fasteners.

For example, in some embodiments, a supplemental containment wall assembly may include a clamp containment wall shell with multiple clamp shell segments, which are implemented to be clamped circumferentially around at least a portion of a pipe fitting. For example, the clamp containment wall shell may include a first clamp shell segment implemented to be secured around a first portion (e.g., top half) of the pipe fitting, a second clamp segment implemented to be secured around a second portion (e.g., bottom half) of the pipe fitting, and so on. In some such embodiments, the clamp shell segments may include threaded fastener openings, which are implemented to enable corresponding threaded fasteners, such as a bolt or a screw, to be selectively tightened therein. In other words, in such embodiments, the supplemental containment wall assembly may include threaded fasteners, which may be tightened in the threaded fastener openings to facilitate securing and sealing the clamp shell segments around the pipe fitting and, thus, implementing a sealed fitting annulus between at least the pipe fitting and the clamp containment wall shell.

In other embodiments, a supplemental containment wall assembly may include a sleeve containment wall shell, which is implemented to be slid over and secured around at least a portion of a pipe fitting. In some such embodiments, the supplemental containment wall assembly may include internal worm clamp fasteners implemented circumferentially within the sleeve containment wall shell, for example, around a shell grab tab, a containment wall seal, and/or an end of the sleeve containment wall shell. In other words, in such embodiments, tightening one or more of the internal worm clamp fasteners may compress the sleeve containment wall shell inwardly, which may facilitate securing and sealing the sleeve containment wall shell around the pipe fitting and, thus, implementing a sealed fitting annulus between at least the pipe fitting and the sleeve containment wall shell.

In still further embodiments, a supplemental containment wall assembly may include a wrap containment wall shell, which is implemented to be wrapped and secured around at least a portion of a pipe fitting. In some such embodiments, the supplemental containment wall assembly may include external worm clamp fasteners, which are implemented to be wrapped circumferentially around the wrap containment wall shell, for example, over a shell grab tab, over a containment wall seal, and/or over an end of the sleeve containment wall shell. In other words, in such embodiments, tightening one or more of the external worm clamp fasteners may compress the wrap containment wall shell inwardly, which may facilitate securing and sealing the wrap containment wall shell around the pipe fitting and, thus, implementing a sealed fitting annulus between at least the pipe fitting and the wrap containment wall shell.

In any case, to facilitate reducing the likelihood of a supplemental containment wall assembly moving relative to a pipe fitting at which it is deployed, the supplemental containment wall assembly may include one or more shell grab tabs, which are each implemented on an inner surface of its containment wall shell. In particular, the shell grab tabs may each be implemented (e.g., sized and/or shaped) to matingly interlock (e.g., engage and/or interface) with at least a portion of a corresponding fitting grab notch implemented along the outer surface of the pipe fitting. For example, a first clamp shell segment of a clamp containment wall shell may include a first shell grab tab that is implemented on its inner surface to matingly interface with a first portion of the fitting grab notch, a second clamp shell segment of the clamp containment wall shell may include a second shell grab tab that is implemented on its inner surface to matingly interface with a second portion of the fitting grab notch, and so on. Additionally or alternatively, a shell grab tab that is implemented to matingly interface with the fitting grab notch on the pipe fitting may be implemented circumferentially along an inner surface of a sleeve containment wall shell or an inner surface of a wrap containment wall shell.

Furthermore, to facilitate implementing a sealed fitting annulus and, thus, providing multi-wall containment, one or more containment wall seals may be implemented on an inner surface of the containment wall shell of a supplemental containment wall assembly. For example, in some embodiments, the supplemental containment wall assembly may include one or more containment wall seals integrated with corresponding shell grab tabs. In particular, in such embodiments, an integrated containment wall seal may be implemented at least in part by coating a shell grab tab with a sealing material, such as rubber.

Additionally or alternatively, a supplemental containment wall assembly may include one or more discrete containment wall seals, such as an O-ring or a belt seal. For example, a first portion of a discrete containment wall seal may be implemented on an inner surface of a first clamp shell segment, a second portion of the discrete containment wall seal may be implemented on an inner surface of a second clamp shell segment, and so on. In fact, in some embodiments, multiple discrete containment wall seals may be implemented on the inner surface of a containment wall shell. For example, a first discrete containment wall seal may be implemented on a first (e.g., inner) side of a shell grab tab on an inner surface of the containment wall shell and a second discrete containment wall seal may be implemented on a second (e.g., outer) side of the shell grab tab on the inner surface of the containment wall shell. Thus, as will be described in more detail below, deploying a supplemental containment wall assembly at least at a pipe fitting in a pipeline system may facilitate providing multi-wall containment in the pipeline, for example, at least in part by defining (e.g., enclosing) a sealed fitting annulus between the pipe fitting and the supplemental containment wall assembly.

To help illustrate, an example of a pipeline system 10 is shown in FIG. 1. As in the depicted example, the pipeline system 10 may be coupled between a bore fluid source 12 and a bore fluid destination 14. Merely as an illustrative not limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, the pipeline system 10 may generally be implemented and/or operated to facilitate transporting (e.g., conveying) fluid, such as gas and/or liquid, from the bore fluid source 12 to the bore fluid destination 14. In fact, in some embodiments, the pipeline system 10 may be used in many applications, including without limitation, both onshore and offshore oil and gas applications. For example, in such embodiments, the pipeline system 10 may be used to transport one or more hydrocarbons, such as crude oil, petroleum, natural gas, or any combination thereof. Additionally or alternatively, the pipeline system 10 may be used to transport one or more other types of fluid, such as produced water, fresh water, fracturing fluid, flowback fluid, carbon dioxide, or any combination thereof.

To facilitate flowing fluid to the bore fluid destination 14, in some embodiments, the bore fluid source 12 may include one or more bore fluid pumps 16 that are implemented and/or operated to inject (e.g., pump and/or supply) fluid from the bore fluid source 12 into a bore of the pipeline system 10. However, it should be appreciated that the depicted example is merely intended to be illustrative and not limiting. In particular, in other embodiments, one or more bore fluid pumps 16 may not be implemented at the bore fluid source 12, for example, when fluid flow through the bore of the pipeline system 10 is produced by gravity. Additionally or alternatively, in other embodiments, one or more bore fluid pumps 16 may be implemented in the pipeline system 10 and/or at the bore fluid destination 14.

To facilitate transporting fluid from the bore fluid source 12 to the bore fluid destination 14, as in the depicted example, a pipeline system 10 may include one or more pipe fittings (e.g., connectors) 18 and one or more pipe segments 20. For example, the depicted pipeline system 10 includes a first pipe segment 20A, a second pipe segment 20B, and an Nth pipe segment 20N. Additionally, the depicted pipeline system 10 includes a first pipe (e.g., end) fitting 18A, which couples the bore fluid source 12 to the first pipe segment 20A, a second (e.g., midline) pipe fitting 18B, which couples the first pipe segment 20A to the second pipe segment 20B, and an Nth pipe (e.g., end) fitting 18N, which couples the Nth pipe segment 20N to the bore fluid destination 14.

However, it should again be appreciated that the depicted example is merely intended to be illustrative and not limiting. In particular, in other embodiments, a pipeline system 10 may include fewer (e.g., one) pipe segments 20. Additionally or alternatively, in other embodiments, a pipeline system 10 may include fewer (e.g., two) pipe fittings 18.

In any case, as described above, a pipe segment 20 generally includes tubing that may be used to convey (e.g., transfer and/or transport) water, gas, oil, and/or any other suitable type of fluid. The tubing of a pipe segment 20 may be made of any suitable type of material, such as plastic, metal, and/or a composite (e.g., fiber-reinforced composite) material. In fact, as will be described in more detail below, in some embodiments, the tubing of a pipe segment 20 may be implemented using multiple different layers. For example, the tubing of a pipe segment 20 may include a first high-density polyethylene (e.g., internal corrosion protection) layer, one or more reinforcement (e.g., steel strip) layers external to the first high-density polyethylene layer, and a second high-density polyethylene (e.g., external corrosion protection) layer external to the one or more reinforcement layers.

Additionally, as in the depicted example, one or more (e.g., second and/or Nth) pipe segments 20 in a pipeline system 10 may be curved. To facilitate implementing a curve in a pipe segment 20, in some embodiments, the pipe segment 20 may be flexible, for example, such that the pipe segment 20 is spoolable on a pipe reel and/or a pipe drum (e.g., during transport and/or before deployment of the pipe segment 20). In other words, in some embodiments, one or more pipe segments 20 in the pipeline system 10 may be a flexible pipe, such as a bonded flexible pipe, an unbonded flexible pipe, a flexible composite pipe (FCP), a thermoplastic composite pipe (TCP), or a reinforced thermoplastic pipe (RTP). In fact, at least in some instances, increasing flexibility of a pipe segment 20 may facilitate improving deployment efficiency of a pipeline system 10, for example, by obviating a curved (e.g., elbow) pipe fitting 18 and/or enabling the pipe segment 20 to be transported to the pipeline system 10, deployed in the pipeline system 10, or both using a tighter spool.

To facilitate improving pipe flexibility, in some embodiments, the tubing of a pipe segment 20 that defines (e.g., encloses) its pipe bore may include one or more openings devoid of solid material. In fact, in some embodiments, an opening in the tubing of a pipe segment 20 may run (e.g., span) the length of the pipe segment 20 and, thus, define (e.g., enclose) a fluid conduit in the annulus of the tubing, which is separate from the pipe bore. In other words, in such embodiments, fluid may flow through a pipe segment 20 via its pipe bore, a fluid conduit implemented within its tubing annulus, or both.

Figure 2:
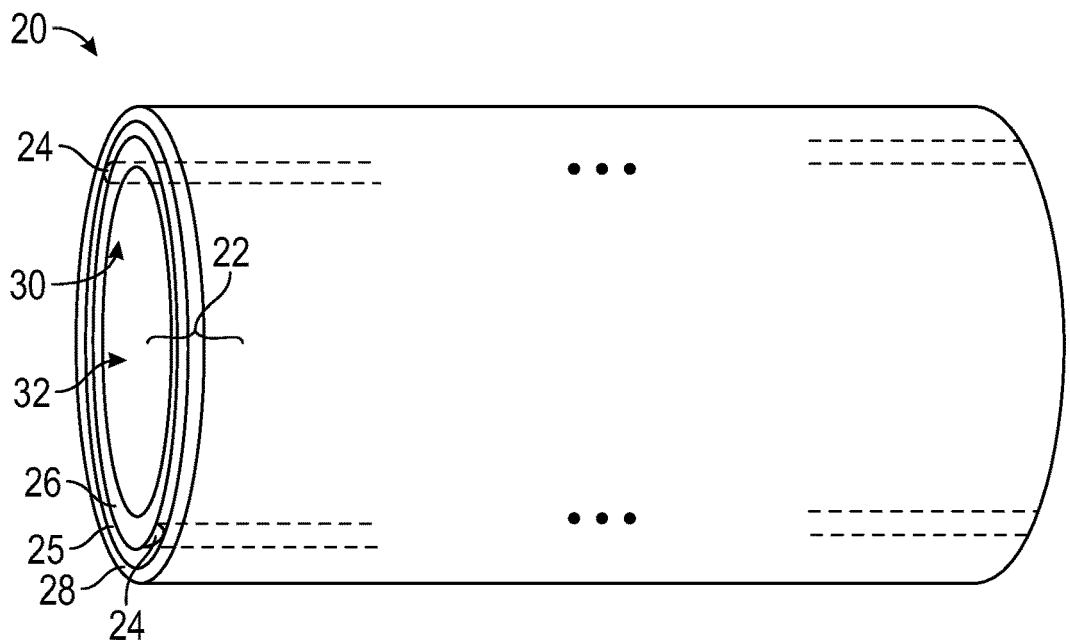
FIG. 2 is a side view of an example of a pipe segment of FIG. 1 that includes a bore defined by its tubing as well as fluid conduits implemented within an annulus of its tubing, in accordance with an embodiment of the present disclosure.

To help illustrate, an example of a pipe segment 20, which includes tubing 22 with fluid conduits 24 implemented in its annulus 25, is shown in FIG. 2. As depicted, the pipe segment tubing 22 is implemented with multiple layers including an inner (e.g., innermost) layer 26 and an outer (e.g., outermost) layer 28. In some embodiments, the inner layer 26 and/or the outer layer 28 of the pipe segment tubing 22 may be implemented using composite material and/or plastic, such as high-density polyethylene (HDPE) and/or raised temperature polyethylene (PE-RT). In any case, as depicted, an inner surface 30 of the inner layer 26 defines (e.g., encloses) a pipe bore 32 through which fluid can flow, for example, to facilitate transporting fluid from a bore fluid source 12 to a bore fluid destination 14.

Additionally, as depicted, the annulus 25 of the pipe segment tubing 22 is implemented between its inner layer 26 and its outer layer 28. As will be described in more detail below, the tubing annulus 25 may include one or more intermediate layer of the pipe segment tubing 22. Furthermore, as depicted, fluid conduits 24 running along the length of the pipe segment 20 are defined (e.g., enclosed) in the tubing annulus 25. As described above, a fluid conduit 24 in the tubing annulus 25 may be devoid of solid material. As such, pipe segment tubing 22 that includes one or more fluid conduits 24 therein may include less solid material and, thus, exert less resistance to flexure, for example, compared to solid pipe segment tubing 22 and/or pipe segment tubing 22 that does not include fluid conduits 24 implemented therein. Moreover, to facilitate further improving pipe flexibility, in some embodiments, one or more layers in the tubing 22 of a pipe segment 20 may be unbonded from one or more other layers in the tubing 22 and, thus, the pipe segment 20 may be an unbonded pipe.

However, it should be appreciated that the depicted example is merely intended to be illustrative and not limiting. In particular, in other embodiments, pipe segment tubing 22 may include fewer (e.g., one) or more (e.g., three, four, or more) fluid conduits 24 defined in its tubing annulus 25. Additionally or alternatively, in other embodiments, a fluid conduit 24 defined in the tubing annulus 25 of a pipe segment 20 may run non-parallel to the pipe bore 32 of the pipe segment 20, for example, such that the fluid conduit 24 is skewed relative to the axial (e.g., longitudinal) extent of the pipe bore 32.

Figure 3:
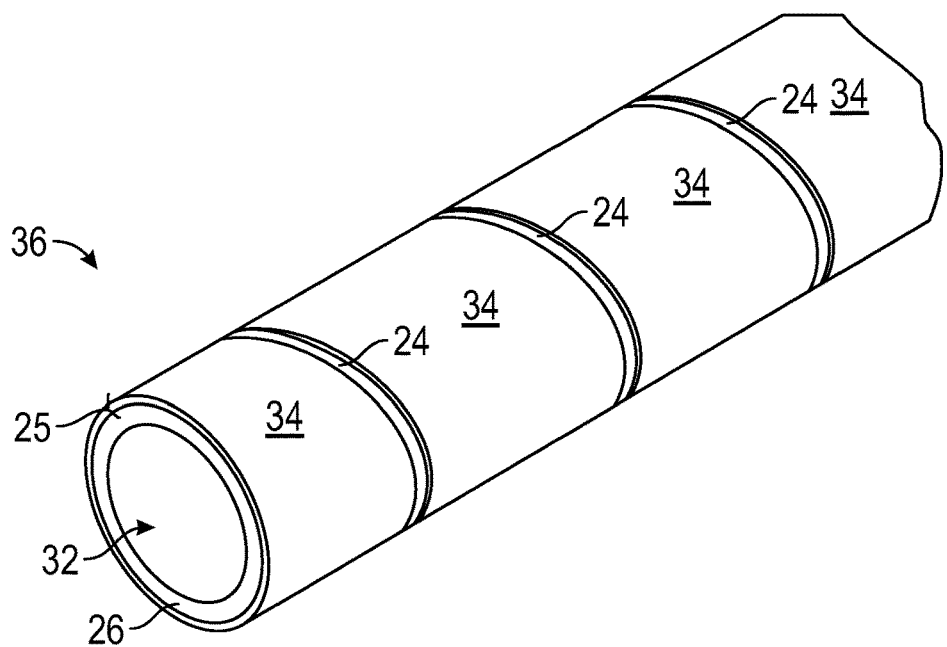
FIG. 3 is a perspective view of an example of the pipe segment of FIG. 2 with a helically shaped fluid conduit implemented within the annulus of its tubing, in accordance with an embodiment of the present disclosure.

To help illustrate, an example of a portion 36 of a pipe segment 20, which includes an inner layer 26 and an intermediate layer 34 included in the annulus 25 of its pipe segment tubing 22, is shown in FIG. 3. In some embodiments, one or more intermediate layers 34 of pipe segment tubing 22 may be implemented at least in part using composite material and/or metal, such as carbon steel, stainless steel, duplex stainless steel, super duplex stainless steel, or any combination thereof. In other words, at least in some such embodiments, the intermediate layer 34 of the pipe segment tubing 22 may be implemented using electrically conductive, which, at least in some instances, may enable communication of electrical (e.g., control and/or sensor) signals via the intermediate layer 34.

In any case, as depicted, the intermediate layer 34 is helically disposed (e.g., wound and/or wrapped) on the inner layer 26 such that gaps (e.g., openings) are left between adjacent windings to define a fluid conduit 24. In other words, in some embodiments, the intermediate layer 34 may be implemented at least in part by winding a metal (e.g., steel) strip around the inner layer 26 at a non-zero lay angle (e.g., fifty-four degrees) relative to the axial (e.g., longitudinal) extent of the pipe bore 32. In any case, as depicted, the resulting fluid conduit 24 runs helically along the pipe segment 20, for example, such that the fluid conduit 24 is skewed fifty-four degrees relative to the axial extent of the pipe bore 32.

In some embodiments, an outer layer 28 may be disposed directly over the depicted intermediate layer 34 and, thus, cover and/or define (e.g., enclose) the depicted fluid conduit 24. However, in other embodiments, the tubing annulus 25 of pipe segment tubing 22 may include multiple (e.g., two, three, four, or more) intermediate layers 34. In other words, in such embodiments, one or more other intermediate layers 34 may be disposed over the depicted intermediate layer 34. In fact, in some such embodiments, the one or more other intermediate layers 34 may also each be helically disposed such that gaps are left between adjacent windings to implement one or more corresponding fluid conduits 24 in the pipe segment tubing 22.

For example, a first other intermediate layer 34 may be helically disposed on the depicted intermediate layer 34 using the same non-zero lay angle as the depicted intermediate layer 34 to cover (e.g., define and/or enclose) the depicted fluid conduit 24 and to implement another fluid conduit 24 in the first other intermediate layer 34. Additionally, a second other intermediate layer 34 may be helically disposed on the first other intermediate layer 34 using another non-zero lay angle, which is the inverse of the non-zero lay angle of the depicted intermediate layer 34, to implement another fluid conduit 24 in the second other intermediate layer 34. Furthermore, a third other intermediate layer 34 may be helically disposed on the second other intermediate layer 34 using the same non-zero lay angle as the second other intermediate layer 34 to cover the other fluid conduit 24 in the second other intermediate layer 34 and to implement another fluid conduit 24 in the third other intermediate layer 34. In some embodiments, an outer layer 28 may be disposed over the third other intermediate layer 34 and, thus, cover (e.g., define and/or enclose) the other fluid conduit 24 in the third other intermediate layer 34.

In any case, to facilitate flowing fluid from a bore fluid source 12 to a bore fluid destination 14, as described above, one or more pipe fittings 18, such as a midline pipe fitting 18 and/or a pipe end fitting 18, may be secured to a pipe segment 20. In particular, as described above, in some instances, a pipe fitting 18 may be secured to a pipe segment 20 using swaging techniques, for example, which conformally deform the pipe fitting 18 around tubing 22 of the pipe segment 20. In fact, in some embodiments, deployment equipment, such as a swage machine, may be implemented and/or operated to facilitate securing a pipe fitting 18 to a pipe segment 20 during deployment of a pipeline system 10.

Figure 4:
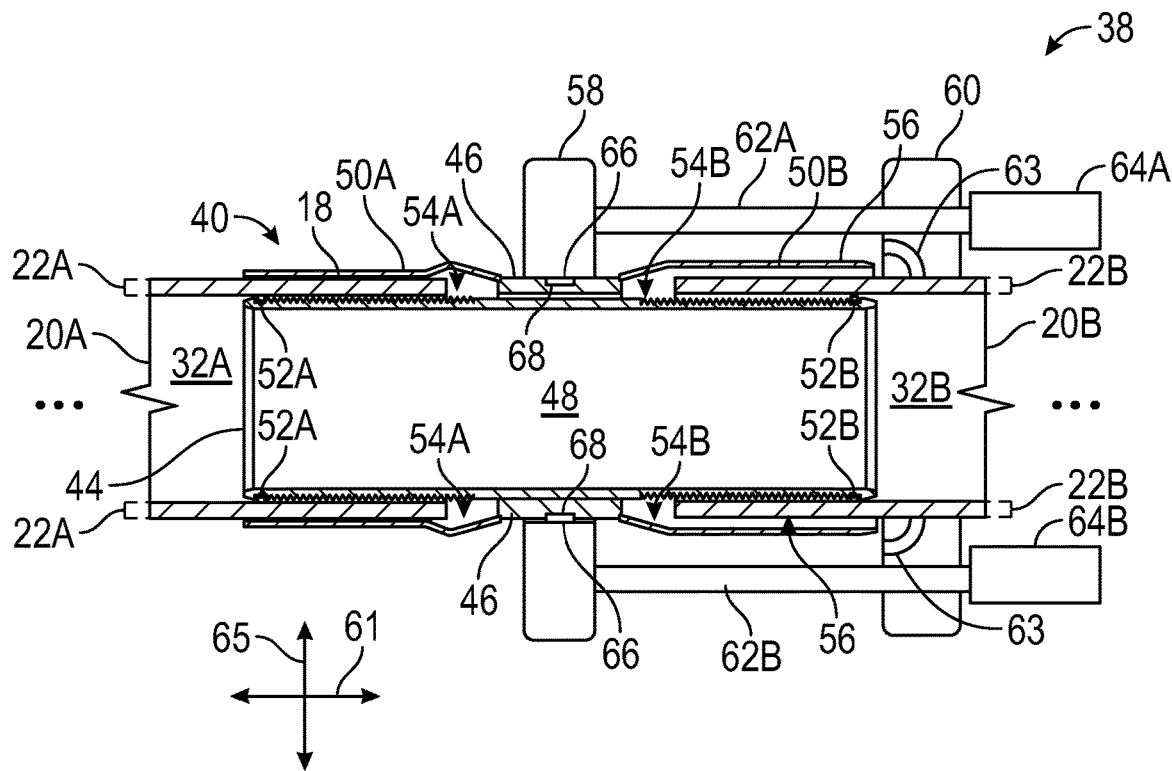
FIG. 4 is an axial cross-section profile of an example of deployment equipment coupled to a portion of the pipeline system of FIG. 1, in accordance with an embodiment of the present disclosure.

To help illustrate, an example cross-section of deployment equipment 38 and a portion 40 of a pipeline system 10 is shown in FIG. 4. As depicted, the portion 40 of the pipeline system 10 includes a first pipe segment 20A, a second pipe segment 20B, and a pipe fitting 18, which is coupled between the first pipe segment 20A and the second pipe segment 20B. Additionally, as depicted, the pipe fitting 18 includes a fitting tube 44 and a grab ring 46, which is implemented around the fitting tube 44. In particular, as depicted, the fitting tube 44 defines (e.g., encloses) a fitting bore 48, which is fluidly coupled to a first pipe bore 32A of the first pipe segment 20A and a second pipe bore 32B of the second pipe segment 20B.

In other words, the pipe fitting 18 in FIG. 4 may be a midline pipe fitting 18. However, it should be appreciated that the depicted example is merely intended to be illustrative and not limiting. In particular, as will be described in more detail below, the techniques described in the present disclosure may additionally or alternatively be used with other types of pipe fittings 18, such as a pipe end fitting 18.

In any case, as depicted, the pipe fitting 18 includes fitting jackets 50—namely a first fitting jacket 50A and a second fitting jacket 50B—and fitting seals 52—namely a first fitting seal 52A and a second fitting seal 52B—implemented circumferentially around the fitting tube 44. In particular, as depicted, first tubing 22A of the first pipe segment 20A is disposed in a first tubing cavity 54A of the pipe fitting 18, which is defined between the first fitting jacket 50A and the fitting tube 44. Similarly, second tubing 22B of the second pipe segment 20B is disposed in a second tubing cavity 54B of the pipe fitting 18, which is defined between the second fitting jacket 50B and the fitting tube 44.

However, as depicted, open space 56 is present between the second tubing 22B of the second pipe segment 20B and the pipe fitting 18 whereas minimal open space is present between the first tubing 22A of the first pipe segment 20A and the pipe fitting 18. In other words, the pipe fitting 18 may exert more resistance to tubing movement in the first tubing cavity 54A and, thus, facilitate securing the pipe fitting 18 to the first pipe segment 20A, for example, in addition to sealing the first tubing 22A of the first pipe segment 20A via the first fitting seal 52A. On the other hand, the pipe fitting 18 may exert less resistance to tubing movement in the second tubing cavity 54B, which, at least in some instances, may enable the second tubing 22B of the second pipe segment 20B to move relatively freely into and/or out from the second tubing cavity 54B of the pipe fitting 18. As such, to facilitate securing the pipe fitting 18 to the second pipe segment 20B, the deployment equipment 38 may be operated to conformally deform (e.g., swage) the second fitting jacket 50B around the second tubing 22B of the second pipe segment 20B, thereby consuming at least a portion (e.g., majority) of the open space 56.

To facilitate conformally deforming a fitting jacket 50 around pipe segment tubing 22, as in the depicted example, the deployment equipment 38 may include a grab plate 58, a die plate 60, one or more guide rods 62, and one or more actuators 64. More specifically, in the depicted example, the deployment equipment 38 includes a first actuator 64A, which is coupled to the grab plate 58 via a first guide rod 62A that extends through the die plate 60. Additionally, the deployment equipment 38 includes a second actuator 64B, which is coupled to the grab plate 58 via a second guide rod 62B that extends through the die plate 60. As such, in some embodiments, the first actuator 64A and/or the second actuator 64B may be operated to selectively push the die plate 60 toward the grab plate 58 and/or to selectively pull the die plate 60 away from the grab plate 58.

Furthermore, as depicted, a die (e.g., one or more die segments or die halves) 63 is disposed in the die plate 60. When compressed against a fitting jacket 50 in an axial direction 61, the shape of the die 63 may compress the fitting jacket 50 inwardly in a radial direction 65, for example, such that the fitting jacket 50 and pipe segment tubing 22 disposed in a corresponding tubing cavity 54 are conformally deformed. In fact, in some embodiments, different dies 63 may be selectively used in the die plate 60, for example, during successive compression cycles and/or depending on characteristics, such as diameter and/or material thickness, of the fitting jacket 50.

To facilitate compressing the die plate 60 and, thus, its die 63 against a fitting jacket 50, as in the depicted example, the grab plate 58 of the deployment equipment 38 may be secured to the pipe fitting 18 via one or more equipment grab tabs 66. In particular, as in the depicted example, an equipment grab tab 66 on the deployment equipment 38 may be implemented (e.g., sized and/or shaped) to matingly interlock (e.g., interface and/or engage) with a corresponding fitting grab notch 68 on the grab ring 46 of the pipe fitting 18 and, thus, facilitate securing the deployment equipment 38 to the pipe fitting 18. As described above, the deployment equipment 38 may then force (e.g., push and/or compress) its die plate 60 and, thus, its die 63 toward its grab plate 58, which may conformally deform the second fitting jacket 50B of the pipe fitting 18 and the second tubing 22B of the second pipe segment 20B and, thus, facilitate securing the pipe fitting 18 to the pipe segment 20B, for example, in addition to sealing the second tubing 22B of second pipe segment 20B via the second fitting seal 52B.

To facilitate improving fluid isolation provided, as described above, a pipeline system 10 may be implemented to provide multi-wall containment. In particular, a portion of the pipeline system 10 may provide multi-wall containment when, moving radially outward, the portion of the pipeline system 10 includes multiple structural layers separated by one or more corresponding annuli. For example, to facilitate providing multi-wall (e.g., double wall) containment, as described above, the tubing 22 of a pipe segment 20 deployed in the pipeline system 10 may include an inner layer 26 and an outer layer 28 separated by a tubing annulus 25, for example, which is implemented using one or more intermediate layers 34 that each has one or more fluid conduits 24 (e.g., openings) devoid of solid material. Moreover, the portion of a pipe fitting 18 in which the pipe segment tubing 22 is secured may also be considered as providing multi-wall containment, for example, due to the pipe segment tubing 22 itself already providing multi-wall containment. In fact, in some embodiments, the portion of the pipe fitting 18 in which the pipe segment tubing 22 is to be secured may be considered as providing multi-wall containment even before the pipe segment tubing 22 has been disposed therein, for example, due to a fitting jacket 50 and the fitting tube 44 being separated by a corresponding tubing cavity (e.g., annulus) 54.

However, a different portion of a pipe fitting 18 may be considered as providing single wall containment even after pipe segment tubing 22 has been secured and sealed therein. More specifically, as in the depicted example, the grab ring 46 of the pipe fitting 18 may be implemented at least partially external from the fitting jackets 50 and, thus, pipe segment tubing 22 may not be present between the fitting tube 44 and the grab ring 46 even when the pipe segment tubing 20 is fully inserted into a tubing cavity 54 defined between the fitting tube 44 and a fitting jacket 50. Although implemented with multiple structural layers (e.g., fitting tube 44 and grab ring 46), in some instances, the different portion of the pipe fitting 18 may nevertheless be considered as providing a single wall containment, for example, due to the grab ring 46 directly abutting the fitting tube 44 resulting in the lack of an annulus therebetween. Thus, to facilitate providing multi-wall (e.g., double wall) containment, the present disclosure describes techniques for implementing and/or deploying a supplemental containment wall assembly at least at one or more pipe fittings 18 in a pipeline system 10.

Figure 5:
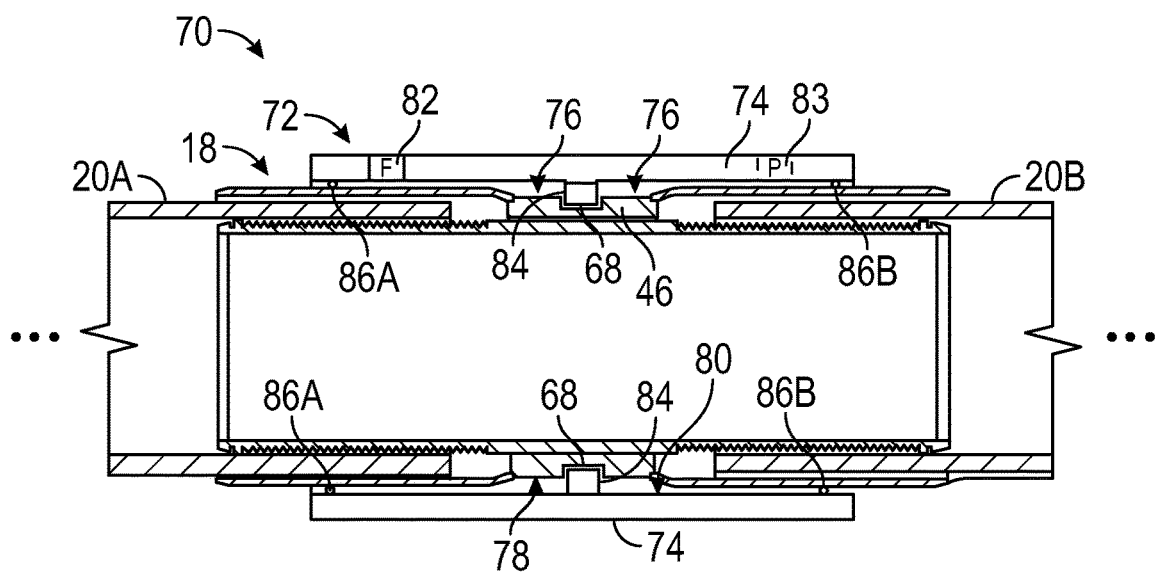
FIG. 5 is an axial cross-section profile of an example of a supplemental containment wall assembly coupled to the portion of the pipeline system of FIG. 4, in accordance with an embodiment of the present disclosure.

To help illustrate, an example of a portion 70 of a pipeline system 10, which includes a supplemental containment wall assembly 72, is shown in FIG. 5. In addition to the supplemental containment wall assembly 72, as depicted, the portion 70 of the pipeline system 10 includes a first pipe segment 20A, a second pipe segment 20B, and a pipe fitting 18. In particular, as depicted, the pipe fitting 18 is coupled between the first pipe segment 20A and the second pipe segment 20B.

In other words, the pipe fitting 18 in FIG. 5 may be a midline pipe fitting 18. However, it should be appreciated that the depicted example is merely intended to be illustrative and not limiting. In particular, as will be described in more detail below, the techniques described in the present disclosure may additionally or alternatively be used with other types of pipe fittings 18, such as a pipe end fitting 18.

In any case, as depicted, the supplemental containment wall assembly 72 includes a containment wall shell 74, which is implemented to be secured and sealed circumferentially around at least a portion of the pipe fitting 18 to define (e.g., enclose) a fitting annulus 76 between an outer surface 78 of the pipe fitting 18 and an inner surface 80 of the containment wall shell 74. As will be described in more detail below, in some embodiments, the containment wall shell 74 of a supplemental containment wall assembly 72 may be a clamp containment wall shell 74 implemented to be clamped circumferentially around at least the portion of the pipe fitting 18. In other embodiments, as will be described in more detail below, the containment wall shell 74 may be a sleeve containment wall shell 74, which is implemented to be slid over (e.g., around) at least the portion of the pipe fitting 18, or a wrap containment wall shell 74, which is implemented to be wrapped circumferentially around at least the portion of the pipe fitting 18.

To facilitate securing the containment wall shell 74 circumferentially around the pipe fitting 18, as in the depicted example, the supplemental containment wall assembly 72 may include one or more fasteners 82. As will be described in more detail below, in some embodiments, the fasteners 82 of a supplemental containment wall assembly 72 may include one or more threaded fasteners 82, such as a screw or a bolt. In other embodiments, the fasteners 82 of a supplemental containment wall assembly 72 may include one or more worm clamp fasteners 82, for example, which may be implemented circumferentially within a sleeve containment wall shell 74 and/or circumferentially around a wrap containment wall shell 74.

Additionally, to facilitate reducing the likelihood of it moving relative to the pipe fitting 18, as in the depicted example, a supplemental containment wall assembly 72 may include one or more shell grab tabs 84 implemented on the inner surface 80 of its containment wall shell 74. In particular, as depicted, a shell grab tab 84 on the containment wall shell 74 may be implemented (e.g., sized and/or shaped) to matingly interlock (e.g., interface and/or engage) with a fitting grab notch 68 on the grab ring 46 of the pipe fitting 18. As described above, in some embodiments, deployment equipment 38, such as a swage machine, may be coupled to the pipe fitting 18 via the fitting grab notch 68 on the grab ring 46 of the pipe fitting 18. In other words, in such embodiments, the fitting grab notch 68 on the grab ring 46 of the pipe fitting 18 may be matingly interlocked with an equipment grab tab 66 of deployment equipment 38 to facilitate securing the pipe fitting 18 to a pipe segment 20 during a first time period and matingly interlocked with a shell grab tab 84 on the containment wall shell 74 to facilitate securing the containment wall shell 74 circumferentially around the pipe fitting 18 during a second (e.g., subsequent and/or non-overlapping) time period.

Furthermore, to facilitate sealing the fitting annulus 76, as in the depicted example, a supplemental containment wall assembly 72 may include one or more containment wall seals 86 implemented on the inner surface 80 of its containment wall shell 74. For example, a first discrete containment wall seal 86A, such as an O-ring seal or a belt seal, may be implemented circumferentially at a first end of the containment wall shell 74 while a second discrete containment wall seal 86B, such as another O-ring seal or another belt seal, may be implemented circumferentially at a second (e.g., opposite) end of the containment wall shell 74. In some embodiments, the supplemental containment wall assembly 72 may additionally or alternatively include one or more containment wall seals 86 integrated with corresponding shell grab tabs 84 on the containment wall shell 74, for example, which are implemented at least in part by coating the shell grab tabs 84 with sealing material, such as rubber.

However, it should be appreciated that the depicted example is merely intended to be illustrative and not limiting. In particular, in some embodiments, a supplemental containment wall assembly 72 may additionally include one or more ports 83 that open through its containment wall shell 74, for example, to enable fluid in a corresponding fitting annulus 76 to be sampled to facilitate integrity testing a pipeline system 10 in which the supplemental containment wall assembly 72 is deployed. Additionally, in other embodiments, the containment wall shell 74 of a supplemental containment wall assembly 72 deployed at a pipe fitting 18 may be extended such that the containment wall shell 74 is secured circumferentially around at least a portion of a pipe segment 20 secured to the pipe fitting 18. Moreover, as described above, different embodiments of supplemental containment wall assemblies 72 may include different types of containment wall shells 74 and/or different types of fasteners 82.

Figure 6:
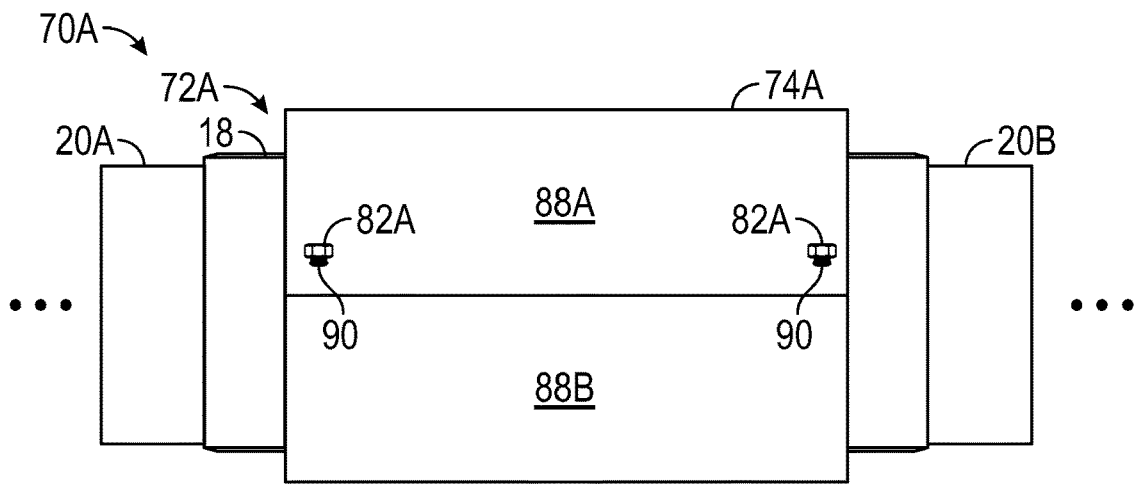
FIG. 6 is a side view of an example of the supplemental containment wall assembly, which includes a clamp containment wall shell, and the portion of the pipeline system of FIG. 5, in accordance with an embodiment of the present disclosure.

To help illustrate, a more detailed example of a portion 70A of a pipeline system 10, which includes a supplemental containment wall assembly 72A with a clamp containment wall shell 74A and threaded fasteners 82A, is shown in FIG. 6. In addition to the supplemental containment wall assembly 72A, as depicted, the portion 70A of the pipeline system 10 includes a first pipe segment 20A, a second pipe segment 20B, and a pipe fitting 18. In particular, as depicted, the pipe fitting 18 is coupled between the first pipe segment 20A and the second pipe segment 20B.

In other words, the pipe fitting 18 in FIG. 6 may be a midline pipe fitting 18. However, it should be appreciated that the depicted example is merely intended to be illustrative and not limiting. In particular, as will be described in more detail below, the techniques described in the present disclosure may additionally or alternatively be used with other types of pipe fittings 18, such as a pipe end fitting 18.

In any case, as depicted, the clamp containment wall shell 74A secured circumferentially around the pipe fitting 18 includes multiple clamp shell segments 88. In particular, as depicted, the clamp containment wall shell 74A includes a first clamp shell segment 88A, which is implemented to be secured around a first portion (e.g., top half) of the pipe fitting 18. Additionally, the clamp containment wall shell 74A includes a second clamp shell segment 88B, which is implemented to be secured around a second portion (e.g., bottom half) of the pipe fitting 18.

To facilitate securing the clamp containment wall shell 74A around the pipe fitting 18, the clamp shell segments 88 may each include one or more threaded fastener openings 90, which are implemented to be aligned with a corresponding threaded fastener opening 90 in another (e.g., opposite) clamp shell segment 88 to enable a threaded fastener 82A to be selectively tightened therein. For example, tightening a threaded fastener 82A in a threaded fastener opening 90 implemented in the first clamp shell segment 88A and a corresponding (e.g., aligned) threaded fastener opening 90 implemented in the second clamp shell segment 88B may force the first clamp shell segment 88A and the second clamp shell segment 88B toward one another. In other words, tightening the threaded fastener 82A may facilitate securing the supplemental containment wall assembly 74A circumferentially around at least a portion of the pipe fitting 18.

However, it should again be appreciated that the depicted example is merely intended to be illustrative and not limiting. In particular, in some embodiments, the clamp shell segments 88 of a clamp containment wall shell 74A may be coupled together on one side via a hinge. Moreover, as described above, other embodiments of a supplemental containment wall assembly 72 may include different types of containment wall shells 74 and/or different types of fasteners 82.

Figure 7:
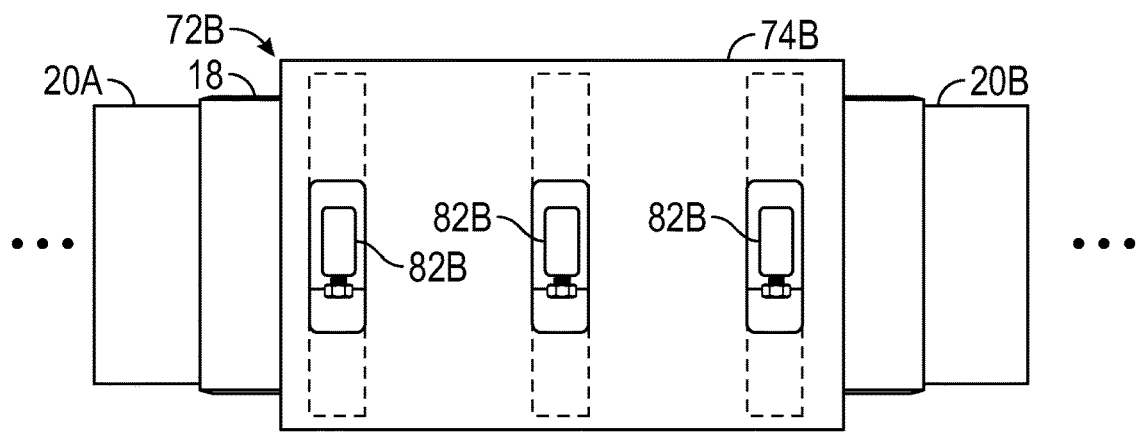
FIG. 7 is a side view of another example of the supplemental containment wall assembly, which includes a sleeve containment wall shell, and the portion of the pipeline system of FIG. 5, in accordance with an embodiment of the present disclosure.

To further help illustrate, another more detailed example of a portion 70B of a pipeline system 10, which includes a supplemental containment wall assembly 72B with a sleeve containment wall shell 74B and internal worm clamp fasteners 82B, is shown in FIG. 7. In addition to the supplemental containment wall assembly 72B, as depicted, the portion 70B of the pipeline system 10 includes a first pipe segment 20A, a second pipe segment 20B, and a pipe fitting 18. In particular, as depicted, the pipe fitting 18 is coupled between the first pipe segment 20A and the second pipe segment 20B.

In other words, the pipe fitting 18 in FIG. 7 may be a midline pipe fitting 18. However, it should be appreciated that the depicted example is merely intended to be illustrative and not limiting. In particular, as will be described in more detail below, the techniques described in the present disclosure may additionally or alternatively be used with other types of pipe fittings 18, such as a pipe end fitting 18.

In any case, as depicted, the supplemental containment wall assembly 72B includes a sleeve containment wall shell 74B, which is implemented to be slid over and secured circumferentially around at least a portion of the pipe fitting 18. To facilitate securing the sleeve containment wall shell 74B circumferentially around the pipe fitting 18, as in the depicted example, the supplemental containment wall assembly 72B may include one or more internal worm clamp fasteners 82B implemented within the sleeve containment wall shell 74B. For example, a first internal worm clamp fastener 82B may be implemented around (e.g., over) a first discrete containment wall seal 86A on an inner surface 80 of the sleeve containment wall shell 74B, a second internal worm clamp fastener 82B may be implemented around a shell grab tab 84 on the inner surface 80 of the sleeve containment wall shell 74B, and a third internal worm clamp fastener 82B may be implemented around a second discrete containment wall seal 86B on the inner surface 80 of the sleeve containment wall shell 74B. In any case, tightening an internal worm clamp fastener 82B may compress the sleeve containment wall shell 74B inwardly and, thus, facilitate securing the supplemental containment wall assembly 74B circumferentially around at least a portion of the pipe fitting 18.

However, it should again be appreciated that the depicted example is merely intended to be illustrative and not limiting. In particular, in other embodiments, one or more worm clamp fasteners 82 may additionally or alternatively be implemented external to a sleeve containment wall shell 74B of a supplemental containment wall assembly 72. Moreover, as described above, other embodiments of a supplemental containment wall assembly 72 may include different types of containment wall shells 74 and/or different types of fasteners 82.

Figure 8:
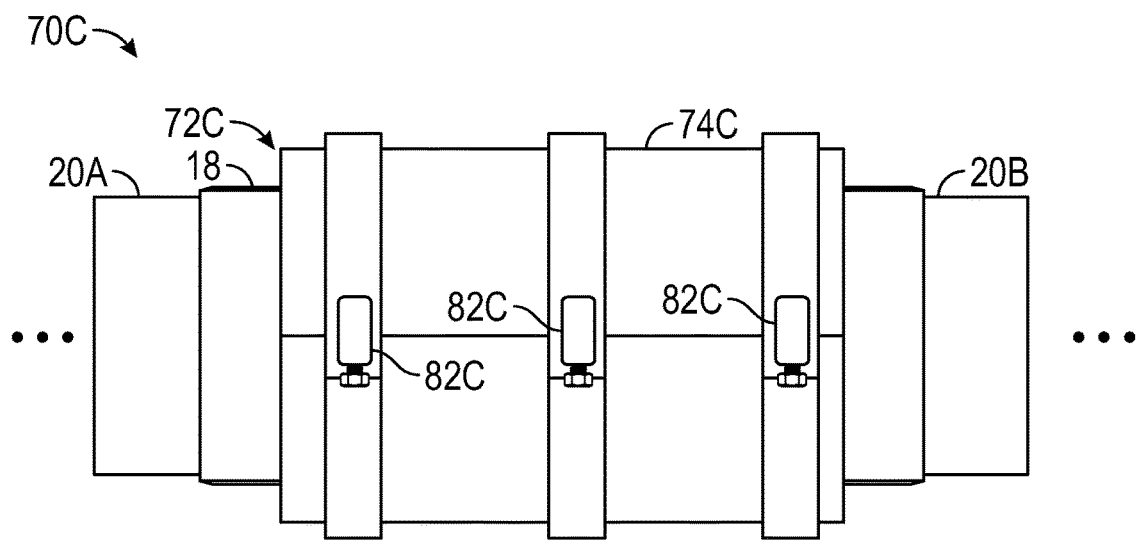
FIG. 8 is a side view of a further example of the supplemental containment wall assembly, which includes a wrap containment wall shell, and the portion of the pipeline system of FIG. 5, in accordance with an embodiment of the present disclosure.

To further help illustrate, another more detailed example of a portion 70C of a pipeline system 10, which includes a supplemental containment wall assembly 72C with a wrap containment wall shell 74C and external worm clamp fasteners 82C, is shown in FIG. 8. In addition to the supplemental containment wall assembly 72C, as depicted, the portion 70C of the pipeline system 10 includes a first pipe segment 20A, a second pipe segment 20B, and a pipe fitting 18. In particular, as depicted, the pipe fitting 18 is coupled between the first pipe segment 20A and the second pipe segment 20B.

In other words, the pipe fitting 18 in FIG. 8 may be a midline pipe fitting 18. However, it should be appreciated that the depicted example is merely intended to be illustrative and not limiting. In particular, as will be described in more detail below, the techniques described in the present disclosure may additionally or alternatively be used with other types of pipe fittings 18, such as a pipe end fitting 18.

In any case, as depicted, the supplemental containment wall assembly 72C includes a wrap containment wall shell 74C, which is implemented to be wrapped and secured circumferentially around at least a portion of the pipe fitting 18. To facilitate securing the wrap containment wall shell 74C circumferentially around the pipe fitting 18, as in the depicted example, the supplemental containment wall assembly 72C may include one or more external worm clamp fasteners 82C implemented around the wrap containment wall shell 74C. For example, a first external worm clamp fastener 82C may be implemented around (e.g., over) a first discrete containment wall seal 86A on an inner surface 80 of the wrap containment wall shell 74C, a second external worm clamp fastener 82C may be implemented around a shell grab tab 84 on the inner surface 80 of the wrap containment wall shell 74C, and a third external worm clamp fastener 82C may be implemented around a second discrete containment wall seal 86B on the inner surface 80 of the wrap containment wall shell 74C. In any case, tightening an external worm clamp fastener 82C may compress the wrap containment wall shell 74C inwardly and, thus, facilitate securing the supplemental containment wall assembly 74C circumferentially around at least a portion of the pipe fitting 18.

However, it should again be appreciated that the depicted example is merely intended to be illustrative and not limiting. In particular, in other embodiments, one or more worm clamp fasteners 82 may additionally or alternatively be implemented internal to a wrap containment wall shell 74C of a supplemental containment wall assembly 72. Moreover, as described above, the techniques described in the present disclosure may additionally or alternatively be implemented with a pipe end fitting 18.

Figure 9:
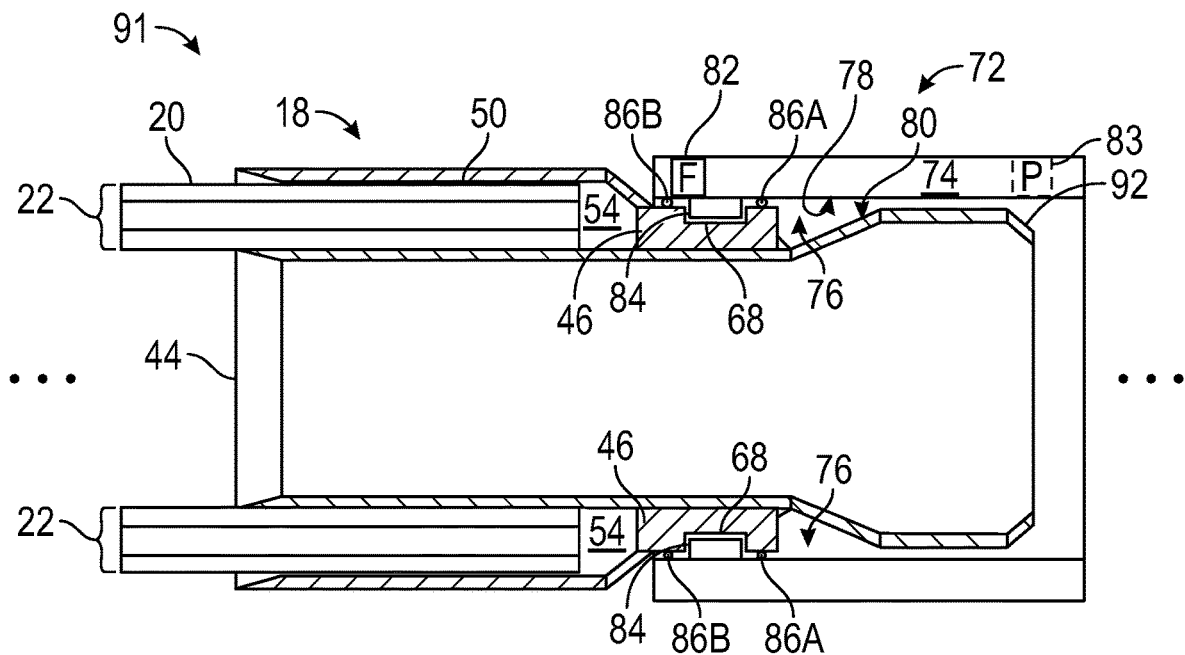
FIG. 9 is an axial cross-section profile of an example of a portion of a supplemental containment wall assembly coupled to another portion of the pipeline system of FIG. 1, in accordance with an embodiment of the present disclosure.

To help illustrate, an example of a portion 91 of a pipeline system 10, which includes a supplemental containment wall assembly 72 and a pipe end fitting 18, is shown in FIG. 9. As depicted, the portion 91 of the pipeline system 10 additionally includes a pipe segment 20, which is secured in the pipe end fitting 18. In particular, as depicted, tubing 22 of the pipe segment 22 is secured in a tubing cavity 54 defined between a fitting jacket 50 and a fitting tube 44 of the pipe fitting 18.

Additionally, as depicted, the fitting tube 44 of the pipe end fitting 18 includes a fitting weld neck 92. However, as depicted, the fitting weld neck 92 includes a single layer and, thus, may be considered as providing single wall containment. As such, to facilitate providing multi-wall (e.g., double wall) containment, the supplemental containment wall assembly 72 may be secured circumferentially around the fitting weld neck 92, for example, in addition to being secured circumferentially around the grab ring 46 of the pipe fitting 18. In particular, as depicted, a containment wall shell 74 of the supplemental containment wall assembly 72 may be secured around the pipe fitting 18 via one or more fasteners 82 such that a shell grab tab 84 implemented on an inner surface 80 of the containment wall shell 74 matingly interlocks with a fitting grab notch 68 on an outer surface 78 of the pipe fitting 18 and a fitting annulus 76 is sealed between the inner surface 80 of the containment wall shell 74 and the outer surface 78 of the pipe fitting 18.

To facilitate sealing the fitting annulus 76, as described above, the supplemental containment wall assembly 72 may include one or more containment wall seals 86. For example, the supplemental containment wall assembly 72 may include a first discrete containment wall seal 86A implemented on a first (e.g., inner) side of the shell grab tab 84 and/or a second discrete containment wall seal 86B implemented on a second (e.g., outer) side of the shell grab tab 84. Additionally or alternatively, the supplemental containment wall assembly 72 may include a containment wall seal 86 integrated with the shell grab tab 84, for example, which is implemented at least in part by coating the shell grab tab 84 with a sealing material, such as rubber.

However, it should be appreciated that the depicted example is merely intended to be illustrative and not limiting. In particular, in some embodiments, a discrete containment wall seal 86 implemented on an inner side of a shell grab tab 84 may be obviated by a containment wall seal 86 integrated with the shell grab tab 84 and, thus, not included in a supplemental containment wall assembly 72. Additionally or alternatively, a discrete containment wall seal 86 implemented on an outer side of a shell grab tab 84 may be obviated by a containment wall seal 86 integrated with the shell grab tab 84 and, thus, not included in a supplemental containment wall assembly 72. Moreover, in some embodiments, a supplemental containment wall assembly 72 may include one or more ports 83 that open through its containment wall shell 74, for example, to enable fluid in a corresponding fitting annulus 76 to be sampled to facilitate integrity testing the pipeline system 10 in which the supplemental containment wall assembly 72 is deployed.

In any case, in some embodiments, the fitting weld neck 92 of the pipe fitting 18 may be used to facilitate fluidly coupling the pipe fitting 18 to a bore fluid source 12 and/or a bore fluid destination 14, for example, at least in part by securing (e.g., welding) the fitting weld neck 92 directly thereto and/or via a flange secured (e.g., welded) to the weld neck 92. In other embodiments, the weld neck 92 of the pipe fitting 18 may be used to facilitate fluidly coupling the pipe fitting 18 to another pipe fitting 18 in the pipeline system 10. For example, in some such embodiments, the pipe fittings 18 may be fluidly coupled at least in part by securing (e.g., welding) a fitting connector between the fitting weld necks 92 of the pipe fittings 18.

Figure 10:
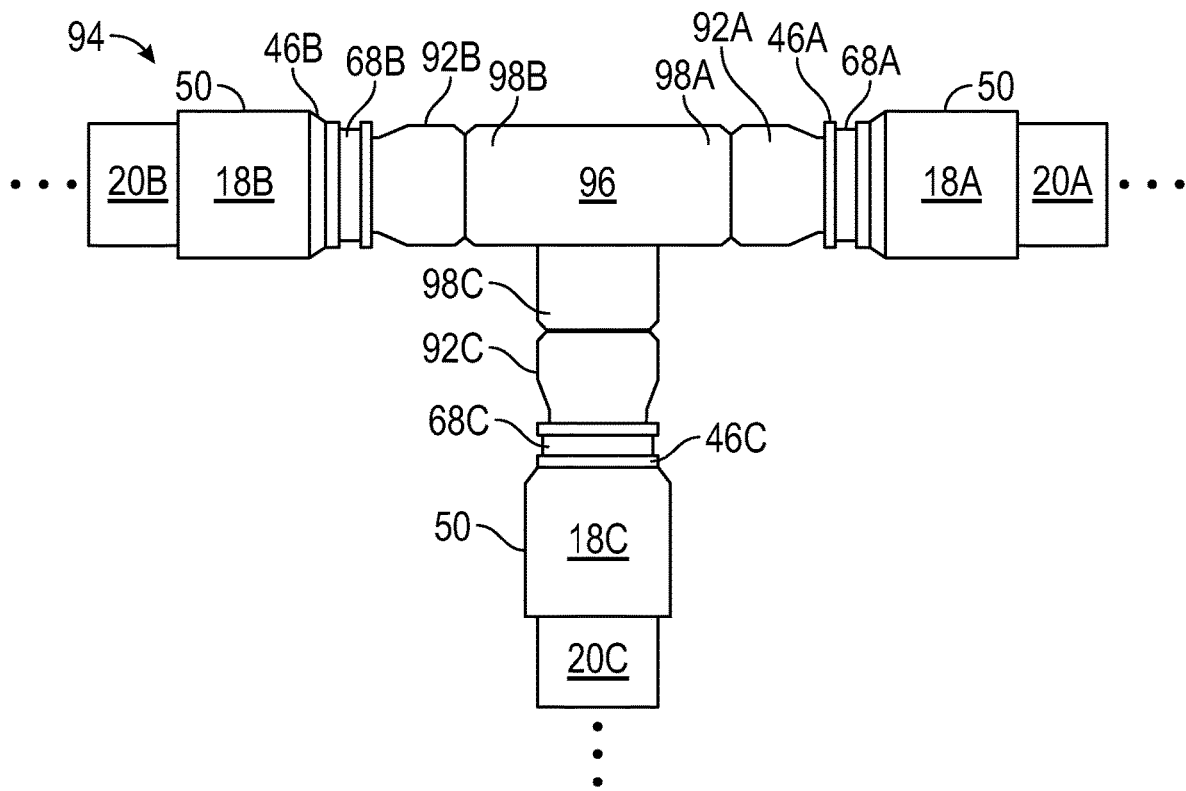
FIG. 10 is a top view of a portion of the pipeline system of FIG. 1 that includes the other portion of the pipeline system of FIG. 9, in accordance with an embodiment of the present disclosure.

To help illustrate, an example of a portion 94 of a pipeline system 10, which includes a fitting connector 96, is shown in FIG. 10. In addition to the fitting connector 96, as depicted, the portion 94 of the pipeline system 10 includes a first pipe segment 20A, a first pipe end fitting 18A, a second pipe segment 20B, a second pipe end fitting 18B, a third pipe segment 20C, and a third pipe end fitting 18C. In particular, as depicted, the first pipe segment 20A is secured within a fitting jacket 50 of the first pipe end fitting 18A, the second pipe segment 20B is secured within a fitting jacket 50 of the second pipe end fitting 18B, and the third pipe segment 20C is secured within a fitting jacket 50 of the third pipe end fitting 18C.

To facilitate securing a pipe segment 20 thereto, as described above, a pipe fitting 18, such as a pipe end fitting 18, may include a grab ring 46 with a fitting grab notch 68 that is implemented (e.g., sized and/or shaped) to matingly interlock (e.g., engage and/or interface) with an equipment grab tab 66 on deployment equipment 38, such as a swage machine. Thus, as depicted, the first pipe end fitting 18A includes a first grab ring 46A with a first fitting grab notch 68A. Similarly, as depicted, the second pipe end fitting 18B includes a second grab ring 46B with a second fitting grab notch 68B and the third pipe end fitting 18C includes a third grab ring 46C with a third grab notch 68C.

Additionally, as depicted, the pipe end fittings 18 each include a fitting weld neck 92, which is coupled (e.g., secured and/or welded) to a corresponding connector weld neck 98 of the fitting connector 96. In particular, as depicted, the first pipe end fitting 18A includes a first fitting weld neck 92A, which is coupled to a first connector weld neck 98A of the fitting connector 96. Similarly, as depicted, the second pipe end fitting 18B includes a second fitting weld neck 92B, which is coupled to a second connector weld neck 98B of the fitting connector 96, and the third pipe end fitting 18C includes a third fitting weld neck 92C, which is coupled to a third connector weld neck 98C of the fitting connector 96.

However, as described above, in some embodiments, a fitting weld neck 92 of a pipe end fitting 18 may be considered as providing single wall containment. Moreover, in some embodiments, the fitting connector 96 may also be considered as providing single wall containment, for example, due to the fitting connector 96 including a single structural layer. Thus, to facilitate providing multi-wall (e.g., double wall) containment, in such embodiments, a supplemental containment wall assembly 72 may be secured circumferentially around at least a portion of each of the pipe end fittings 18 as well as the pipe fitting connector 96.

Figure 11:
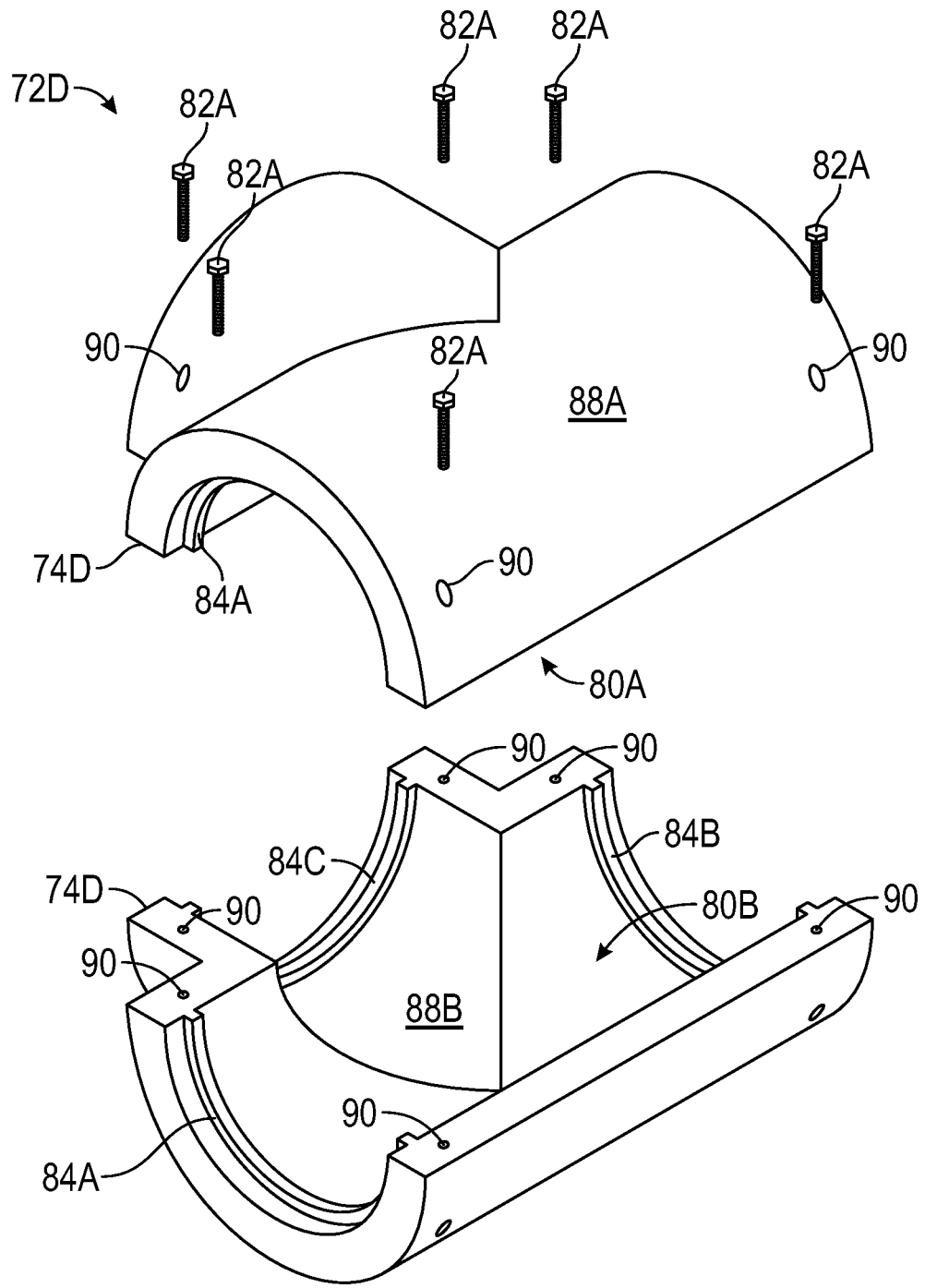
FIG. 11 is a perspective exploded view of another example of a supplemental containment wall assembly to be deployed at the portion of the pipeline system of FIG. 10, in accordance with an embodiment of the present disclosure.

To help illustrate, an example of a supplemental containment wall assembly 72D, which may be secured around multiple pipe end fittings 18 and a pipe fitting connector 96, is shown in FIG. 11. As depicted, the supplemental containment wall assembly 72D includes threaded fasteners 82A, such as a nut or a bolt, and a clamp containment wall shell 74D, which includes a first clamp shell segment 88A and a second clamp shell segment 88B. To facilitate securing the supplemental containment wall assembly 72D circumferentially around multiple pipe end fittings 18 and a pipe fitting connector 96, as depicted, the clamp shell segments 88 of the supplemental containment wall assembly 72D each include threaded fastener openings 90, which may be aligned with corresponding threading fastener openings 90 in the other clamp shell segment 88 of the supplemental containment wall assembly 72D to enable a threaded fastener 82A to be selectively tightened therein.

Additionally, to facilitate reducing the likelihood of a supplemental containment wall assembly 72 inadvertently moving from a location in a pipeline system 10 at which it is deployed, as described above, the supplemental containment wall assembly 72 may include one or more shell grab tabs 84 on the inner surface 80 of its containment wall shell 74, which are implemented (e.g., sized and/or shaped) to matingly interlock (e.g., interface and/or engage) with fitting grab notches 68 of pipe fittings 18 in the pipeline system 10. As depicted, the supplemental containment wall assembly 72D of FIG. 11 includes a first shell grab tab 84A, which is implemented partially on a first inner surface 80A of the first clamp shell segment 88A and partially on a second inner surface 80B of the second clamp shell segment 88B. In particular, the portion of the first fitting grab notch 68A on the first inner surface 80A of the first clamp shell segment 88A may be implemented to matingly interlock with a first portion of a first fitting grab notch 68A on a first pipe end fitting 18A while the portion of the first fitting grab notch 68A on the second inner surface 80B of the second clamp shell segment 88B may be implemented to matingly interlock with a second (e.g., different and/or opposite) portion of the first fitting grab notch 68A on the first pipe end fitting 18A.

Similarly, as depicted, the supplemental containment wall assembly 72D includes a second shell grab tab 84B, which is implemented to matingly interlock with a second fitting grab notch 68B on a second pipe end fitting 18B, and a third shell grab tab 84C, which is implemented to matingly interlock with a third fitting grab notch 68C on a third pipe end fitting 18C. In particular, as depicted, a portion of the second shell grab tab 84B and a portion of the third shell grab tab 84C are both implemented on the second inner surface 80B of the second clamp shell segment 88B. Although obscured from view, another (e.g., different and/or opposite) portion of the second shell grab tab 84B and another portion of the third shell grab tab 84C may be implemented on the first inner surface 80A of the first clamp shell segment 88A.

Moreover, as described above, to facilitate sealing a fitting annulus 76 defined therein, a supplemental containment wall assembly 72 may include one or more containment wall seals 86. For example, in some embodiments, the supplemental containment wall assembly 72D of FIG. 11 may include a first containment wall seal 86 that is integrated with the first shell grab tab 84A at least in part by coating (e.g., covering) the first shell grab tab 84A with a sealing material, such as rubber. In such embodiments, the supplemental containment wall assembly 72D may additionally or alternatively include a second containment wall seal 86 that is integrated with the second shell grab tab 84B and/or a third containment wall seal 86 that is integrated with the third shell grab tab 84C.

However, it should be appreciated that the depicted example is merely intended to be illustrative and not limiting. In particular, in other embodiments, a supplemental containment wall assembly 72 may additionally or alternatively include a discrete containment wall seal 86 implemented on an inner side of each shell grab tab 84 and/or a discrete containment wall seal 86 implemented on an outer side of each shell grab tab 84. In any case, implementing a supplemental containment wall assembly 72 in a pipeline system 10 in this manner may facilitate providing multi-wall containment in the pipeline system 10, which, at least in some instances, may facilitate improving fluid isolation and, thus, operational efficiency of the pipeline system 10.

Figure 12:
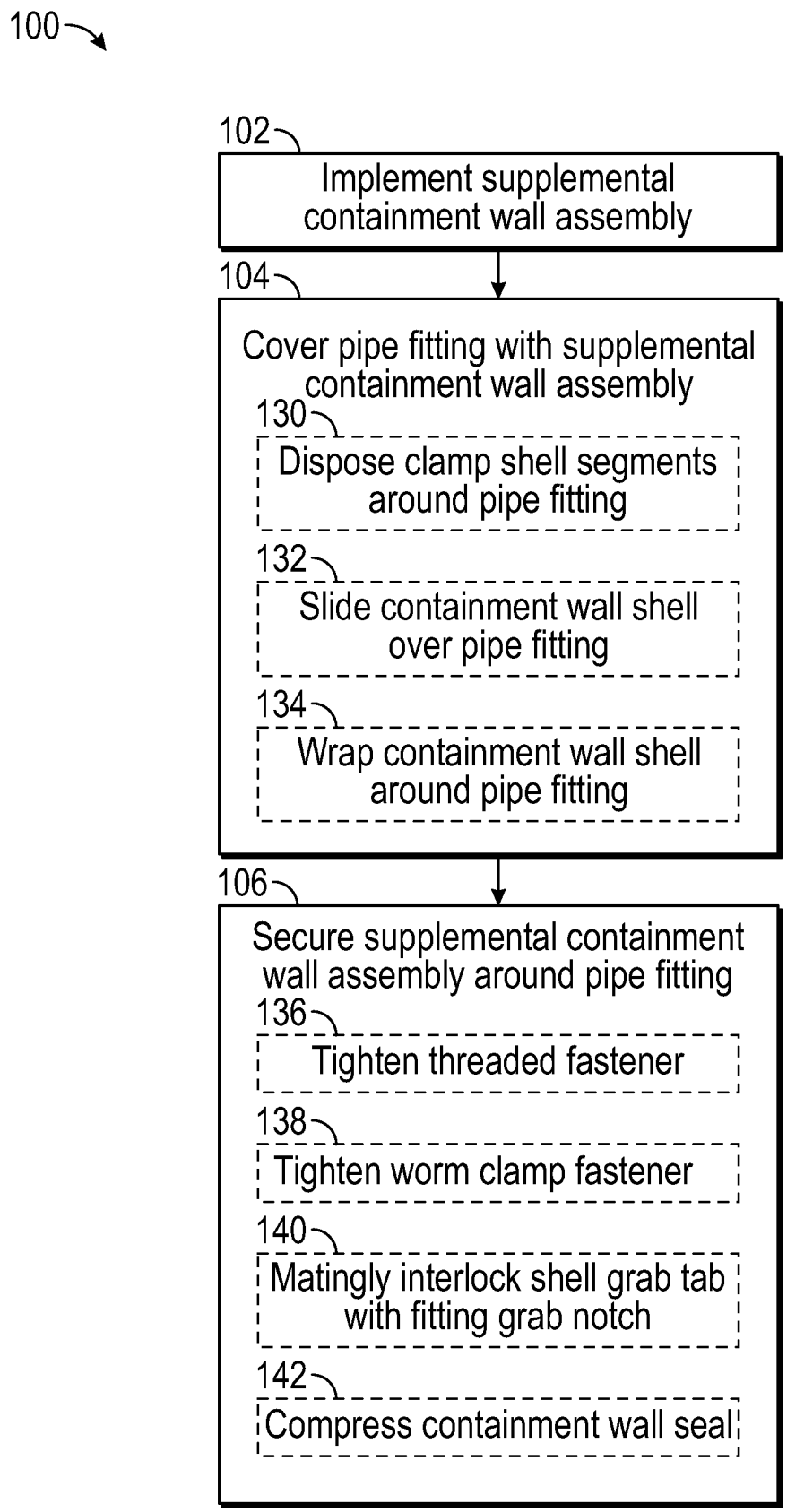
FIG. 12 is a flow diagram of an example process for implementing a pipeline system to provide multi-wall containment, in accordance with an embodiment of the present disclosure.

To help further illustrate, an example of a process 100 for implementing a pipeline system 10 to provide multi-wall containment is described in FIG. 12. Generally, the process 100 includes implementing a supplemental containment wall assembly (process block 102), covering a pipe fitting with the supplemental containment wall assembly (process block 104), and securing the supplemental containment wall assembly around the pipe fitting (process block 106). Although described in a specific order, which corresponds with an embodiment of the present disclosure, it should be appreciated that the example process 100 is merely intended to be illustrative and not limiting. In particular, in other embodiments, a process 100 for implementing a pipeline system 10 to provide multi-wall containment may include one or more additional process blocks and/or omit one or more of the depicted process blocks.

In any case, as described above, a supplemental containment wall assembly 72 may be deployed at least at a pipe fitting 18 in a pipeline system 10 to facilitate providing multi-wall containment. Thus, implementing the pipeline system 10 to provide multi-wall containment may include implementing a supplemental containment wall assembly 72 (process block 102). As described above, the supplemental containment wall assembly 72 may be implemented such that, when deployed at the pipe fitting 18 in the pipeline system 10, a fitting annulus 76 is sealed at least between the supplemental containment wall assembly 72 and the pipe fitting 18.

Figure 13:
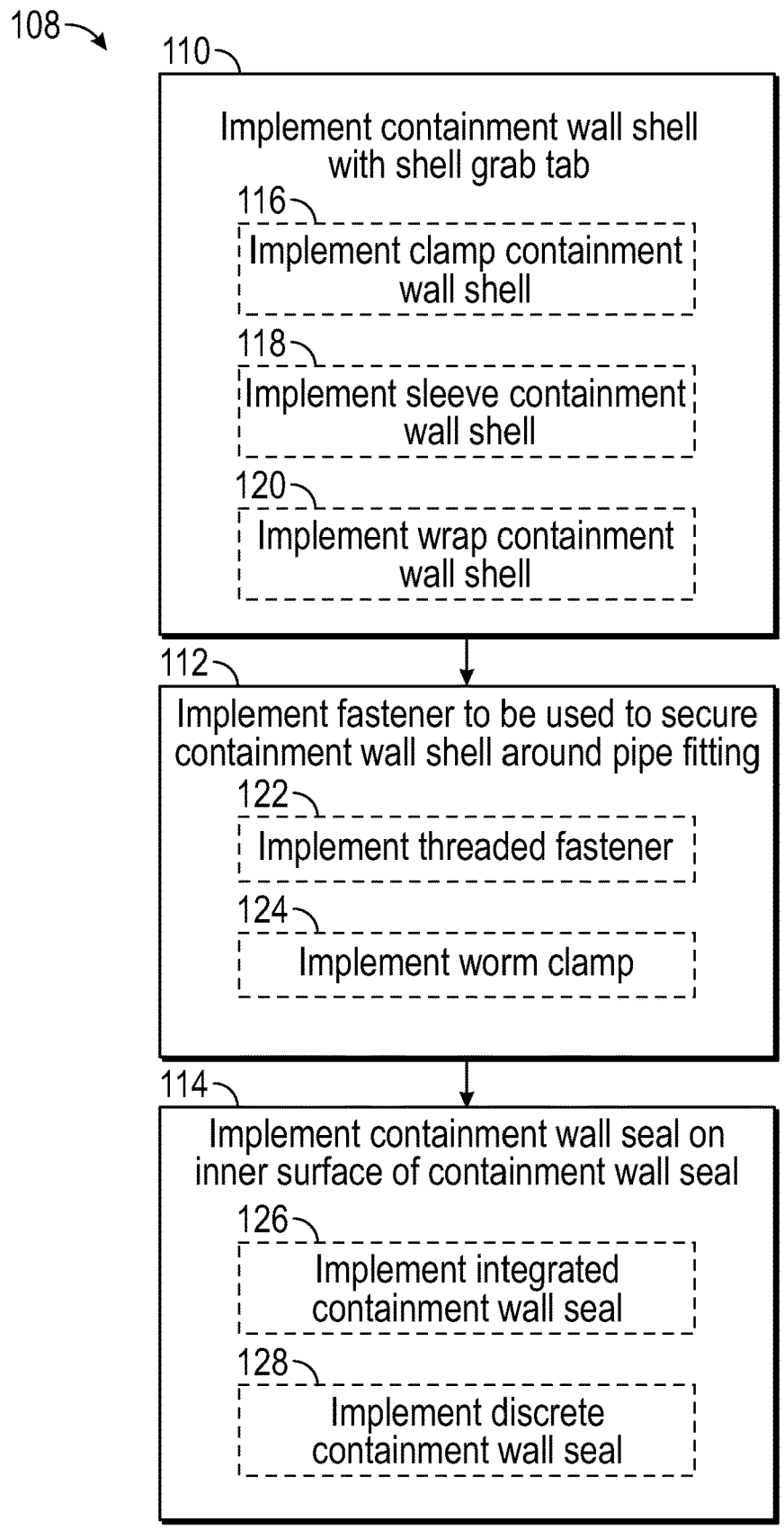
FIG. 13 is a flow diagram of an example process for implementing a supplemental containment wall assembly to be deployed in a pipeline system, in accordance with an embodiment of the present disclosure.

To help illustrate, an example of a process 108 for implementing a supplemental containment wall assembly 72, which may be deployed in a pipeline system 10, is described in FIG. 13. Generally, the process 108 includes implementing a containment wall shell with a shell grab tab (process block 110). Additionally, the process 108 generally includes implementing a fastener to be used to secure the containment wall shell around a pipe fitting (process block 112) and implementing a containment wall seal on an inner surface of the containment wall shell (process block 114)

Although described in a specific order, which corresponds with an embodiment of the present disclosure, it should be appreciated that the example process 108 is merely intended to be illustrative and not limiting. In particular, in other embodiments, a process 108 for implementing a supplemental containment wall assembly 72 may include one or more additional process blocks and/or omit one or more of the depicted process blocks. Additionally or alternatively, in other embodiments, a process 108 for implementing a supplemental containment wall assembly 72 may perform the depicted process blocks in a different order, for example such that the containment wall seal 86 is implemented before the fastener 82.

In any case, as described above, a supplemental containment wall assembly 72 may include a containment wall shell 74 having one or more shell grab tabs 84, which are each implemented (e.g., sized and/or shaped) to matingly interlock (e.g., engage and/or interface) with at least a portion of a corresponding fitting grab notch 68 on a grab ring 46 of a pipe fitting 18. As such, implementing the supplemental containment wall assembly 72 may include implementing a containment wall shell 74 with one or more shell grab tabs 84 on its inner surface 80 (process block 110). More specifically, in some embodiments, the containment wall shell 74 may be implemented at least in part by milling the containment wall shell 74 from a block of material, such as metal. Additionally or alternatively, the containment wall shell 74 may be implemented at least in part by deforming (e.g., bending and/or molding) material, such as metal or plastic.

Furthermore, as described above, in some embodiments, the containment wall shell 74 of a supplemental containment wall assembly 72 may be a clamp containment wall shell 74A. In other words, in such embodiments, implementing containment wall shell 74 may include implementing a clamp containment wall shell 74A (process block 116). Additionally, as described above, in some embodiments, the clamp containment wall shell 74 may include multiple clamp shell segments 88, which are implemented to be disposed circumferentially around at least a portion of a pipe fitting 18. Thus, in such embodiments, implementing the clamp containment wall shell 74A may include implementing multiple clamp shell segments 88, for example, which each include one or more threaded fastener openings 90.

Moreover, as described above, in other embodiments, the containment wall shell 74 of a supplemental containment wall assembly 72 may be a sleeve containment wall shell 74B, which is implemented to be slid over at least a portion of a pipe fitting 18. In other words, in such embodiments, implementing the containment wall shell 74 may include implementing a sleeve containment wall shell 74B (process block 118). Additionally, as described above, in still other embodiments, the containment wall shell 74 of a supplemental containment wall assembly 72 may be a wrap containment wall shell 74C, which is implemented to be wrapped circumferentially around at least a portion of a pipe fitting 18. In other words, in such embodiments, implementing the containment wall shell 74 may include implementing a wrap containment wall shell 74C (process block 120).

Furthermore, as described above, a supplemental containment wall assembly 72 may include one or more fasteners 82, which are implemented to facilitate securing the supplemental containment wall assembly 72 circumferentially around at least a portion of a pipe fitting 18. As such, implementing the supplemental containment wall assembly 72 may include implementing one or more fasteners 82 to be used to facilitate securing the containment wall shell 74 circumferentially around at least the pipe fitting 18 (process block 112). More specifically, as described above, in some embodiments, a fastener 82 of a supplemental containment wall assembly 72 may be a threaded fastener 82A, which is implemented to be selectively tightened in corresponding threaded fastener openings 90 in the containment wall shell 74. In other words, in such embodiments, implementing the fastener 82 may include implementing a threaded fastener 82A, such as screw or a bolt (process block 122).

Additionally, as described above, in other embodiments, a fastener 82 of a supplemental containment wall assembly 72 may be a worm clamp fastener 82, such as an internal worm clamp fastener 82B that is implemented circumferentially within the containment wall shell 74 and/or an external worm clamp fastener 82C that is implemented circumferentially around the containment wall shell 74. Thus, in such embodiments, implementing the fastener 82 may include implementing a worm clamp fastener 82 (process block 124). In particular, in some embodiments, implementing the worm clamp fastener 82 may include implementing an internal worm clamp fastener 82B circumferentially within the containment wall shell 74, for example, such that the internal worm clamp fastener 82B is disposed circumferentially around an end of the containment wall shell 74, a containment wall seal 86 on an inner surface 80 of the containment wall shell 74, and/or a shell grab tab 84 on the inner surface 80 of the containment wall shell 74. Additionally or alternatively, implementing the worm clamp fastener 82 may include implementing an external worm clamp fastener 82C circumferentially around the containment wall shell 74, for example, such that the external worm clamp fastener 82C is disposed circumferentially around an end of the containment wall shell 74, a containment wall seal 86 on an inner surface 80 of the containment wall shell 74, and/or a shell grab tab 84 on the inner surface 80 of the containment wall shell 74.

Furthermore, as described above, a supplemental containment wall assembly 72 may include one or more containment wall seals 86 implemented on an inner surface 80 of its containment wall shell 74 to facilitate sealing a fitting annulus 76 defined between at least the pipe fitting 18 and the supplemental containment wall assembly 72. Thus, implementing the supplemental containment wall assembly 72 may include implementing one or more containment wall seals 86 on the inner surface 80 of the containment wall shell 74 (process block 114). In particular, as described above, in some embodiments, a containment wall seal 86 may be integrated with a shell grab tab 84 on the containment wall shell 74. In other words, in such embodiments, implementing the containment wall seal 86 may include implementing an integrated containment wall seal 86, for example, at least in part by covering (e.g., coating) the shell grab tab 84 with a sealing material, such as rubber (process block 126).

As described above, in some embodiments, a supplemental containment wall assembly 72 may additionally or alternatively include one or more discrete containment wall seals 86. Thus, in such embodiments, implementing the containment wall seal 86 may include implementing a discrete containment wall seal 86 (process block 128). More specifically, in some embodiments, a discrete containment wall seal 86 may be implemented at least in part by disposing an O-ring seal or a belt seal circumferentially along the inner surface 80 of the containment wall shell 74. In this manner, a supplemental containment wall assembly 72 to be deployed in a pipeline system 10 to facilitate providing multi-wall (e.g., double wall) containment may be implemented.

Returning to the process 100 of FIG. 12, the supplemental containment wall assembly 72 may then be used to circumferentially cover at least a portion of a pipe fitting 18 in the pipeline system 10, for example, in addition to portions of one or more other pipe fittings 18 in the pipeline system 10, portions of one or more pipe segments 20 secured to the pipe fittings 18, and/or a fitting connector 96 secured between the pipe fittings 18 (process block 104). More specifically, covering a portion of a pipeline system 10 with the supplemental containment wall assembly 72 may include covering the portion of the pipeline system 10 with the containment wall shell 74 of the supplemental containment wall assembly 72.

As described above, in some embodiments, the containment wall shell 74 of a supplemental containment wall assembly 72 may be a clamp containment wall shell 74A, which includes multiple clamp shell segments 88. Thus, in such embodiments, circumferentially covering at least a portion of the pipe fitting 18 with the supplemental containment wall assembly 72 may include disposing multiple clamp shell segments 88 circumferentially around at least the portion of the pipe fitting 18 (process block 130). In other embodiments, as described above, the containment wall shell 74 of a supplemental containment wall assembly 72 may be a sleeve containment wall shell 74B, which is implemented to be slid over at least a portion of a pipe fitting 18. Thus, in such embodiments, circumferentially covering at least a portion of the pipe fitting 18 with the supplemental containment wall assembly 72 may include sliding the sleeve containment wall shell 74B over at least the portion of the pipe fitting 18 (process block 132). In still other embodiments, as described above, the containment wall shell 74 of a supplemental containment wall assembly 72 may be a wrap containment wall shell 74C, which is implemented to be wrapped circumferentially around at least a portion of a pipe fitting 18. Thus, in such embodiments, circumferentially covering at least a portion of the pipe fitting 18 with the supplemental containment wall assembly 72 may include wrapping the wrap containment sleeve shell 74C circumferentially around at least the portion of the pipe fitting 18 (process block 134).

In any case, the supplemental containment wall assembly 72 may then be secured circumferentially around at least the portion of the pipe fitting 18, for example, in addition to portions of one or more other pipe fittings 18, portions of one or more pipe segments 20 secured to the pipe fittings 18, and/or a fitting connector 96 secured between the pipe fittings 18 (process block 106). As described above, in some embodiments, a supplemental containment wall assembly 72 may include one or more threaded fasteners 82A, which are implemented to be selectively tightened in corresponding threaded fastener openings 90 in the containment wall shell 74 to facilitate securing the supplemental containment wall assembly 72 circumferentially around the pipe fitting 18. Thus, in such embodiments, securing the supplemental containment wall assembly 72 circumferentially around at least the portion of the pipe fitting 18 may include tightening one or more threaded fasteners 82A, such as a screw or a bolt, in corresponding threaded fastener openings 90 implemented in the containment wall shell 74 (process block 136).

In other embodiments, as described above, a supplemental containment wall assembly 72 may include one or more worm clamp fasteners 82, such as an internal worm clamp fastener 82B implemented circumferentially within the containment wall shell 74 of the supplemental containment wall assembly 72 and/or an external worm clamp fastener 82C implemented circumferentially around the containment wall shell 74 of the supplemental containment wall assembly 72. In such embodiments, tightening a worm clamp fastener 82 of the supplement containment wall assembly 72 may compress the containment wall shell 74 inwardly and, thus, facilitate securing the supplemental containment wall assembly 72 around at least a portion of the pipe fitting 18. In other words, in such embodiments, securing the supplemental containment wall assembly 72 at least around a portion of the pipe fitting 18 may include tightening one or more of its worm clamp fasteners 82 (process block 138).

Additionally, to facilitate securing a supplemental containment wall assembly 72 at a pipe fitting 18, as described above, the containment wall shell 74 of the supplemental containment wall assembly 72 may include a shell grab tab 84, which is implemented (e.g., sized and/or shaped) on the inner surface 80 of the containment wall shell 74 to matingly interlock (e.g., engage and/or interface) with a fitting grab notch 68 on a grab ring 46 of the pipe fitting 18. As such, securing the supplemental containment wall assembly 72 circumferentially around at least a portion of the pipe fitting 18 may include matingly interlocking (e.g., engaging and/or interfacing) the shell grab tab 84 on its containment wall shell 74 with the fitting grab notch 68 on the grab ring 46 of the pipe fitting 18 (process block 140). In fact, in some embodiments, tightening one or more threaded fasteners 82A and/or tightening one or more worm clamp fasteners 82 may compress the containment wall shell 74 inwardly and, thus, facilitate matingly interfacing the shell grab tab 84 on the inner surface 80 of the containment wall shell 74 with the fitting grab notch 68 on the grab ring 46 of the pipe fitting 18 (process block 142).

Furthermore, as described above, one or more containment wall seals 86 may be implemented on the inner surface 80 of the containment wall shell 74. As such, compressing the containment wall shell 74 inwardly at least in part by tightening one or more threaded fasteners 82 and/or tightening one or more worm clamp fasteners 82 may compress one or more containment wall seals 86 against a structural layer, such as an outer surface 78 of the pipe fitting 18, an outer surface of a fitting connector 96 secured to the pipe fitting 18, and/or an outer layer 28 of a pipe segment 20 secured to the pipe fitting 18. In this manner, a supplemental containment wall assembly may be deployed at least at a pipe fitting in a pipeline system to facilitate defining a seal fitting annulus between the pipe fitting and the supplemental containment wall assembly and, thus, providing multi-wall (e.g., double wall) containment, which, at least in some instances, may facilitate improving fluid isolation provided by the pipeline system and, thus, operational efficiency of the pipeline system.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A pipeline system comprising:
 a pipe fitting configured to be secured to a pipe segment comprising tubing that defines a pipe bore and a fluid conduit implemented in a tubing annulus of the tubing, wherein the pipe fitting comprises a fitting grab notch implemented on an outer surface of the pipe fitting; and
 a supplemental containment wall assembly configured to be deployed at the pipe fitting, wherein the supplemental containment wall assembly comprises:
  a containment wall shell configured to be secured circumferentially around the pipe fitting to define a fitting annulus that is sealed at least between the outer surface of the pipe fitting and an inner surface of the containment wall shell to facilitate providing multi-wall containment in the pipeline system;
  a shell grab tab implemented on the inner surface of the containment wall shell, wherein the shell grab tab is configured to matingly interlock with the fitting grab notch on the outer surface of the pipe fitting to facilitate securing the containment wall shell to the pipe fitting; and
  a containment wall seal integrated with the shell grab tab on the containment wall shell of the supplemental containment wall assembly at least in part by covering the shell grab tab with sealing material.

2. The pipeline system of claim 1, wherein the fitting grab notch on the outer surface of the pipe fitting is configured to:
 matingly interlock with an equipment grab tab on deployment equipment that operates to facilitate securing the pipe fitting to the pipe segment during a first time period; and
 matingly interlock with the shell grab tab on the inner surface of the containment wall shell to facilitate securing the containment wall shell to the pipe fitting during a second time period following the first time period.

3. The pipeline system of claim 1, wherein:
 the containment wall shell of the supplemental containment wall assembly comprises a clamp containment wall shell configured to be clamped circumferentially around the pipe fitting; and
 the supplemental containment wall assembly comprises one or more threaded fasteners configured to be selectively tightened in corresponding threaded fastener openings implemented in the clamp containment wall shell to facilitate securing the clamp containment wall shell circumferentially around the pipe fitting.

4. The pipeline system of claim 3, wherein the clamp containment wall shell of the supplemental containment wall assembly comprises:
 a first clamp shell segment configured to be secured around a first portion of the pipe fitting, wherein the first clamp shell segment comprises a first threaded fastener opening; and
 a second clamp shell segment configured to be secured around a second portion of the pipe fitting, wherein the second clamp shell segment comprises a second threaded fastener opening configured to be aligned with the first threaded fastener opening in the first clamp shell segment to enable a threaded fastener to be selectively tightened in the first threaded fastener opening in the first clamp shell segment and the second threaded fastener opening in the second clamp shell segment to facilitate securing the clamp containment wall shell circumferentially around the pipe fitting.

5. The pipeline system of claim 1, wherein:
 the pipe fitting is configured to be secured between the pipe segment and another pipe segment;
 the containment wall shell is configured to radially overlap with the pipe segment and the another pipe segment; and
 the supplemental containment wall assembly comprises:
  a first other containment wall seal implemented at least in part by disposing an O-ring seal or a belt seal circumferentially along the inner surface of the containment wall shell such that the first other containment wall seal radially overlaps with the pipe segment; and
  a second other containment wall seal implemented at least in part by disposing another O-ring seal or another belt seal circumferentially along the inner surface of the containment wall shell such that the second other containment wall seal radially overlaps with the another pipe segment.

6. The pipeline system of claim 1, comprising another pipe fitting configured to be secured to the pipe fitting, wherein:
 the another pipe fitting comprises another fitting grab notch implemented on another other surface of the another pipe fitting; and
 the supplemental containment wall assembly comprises:
  another shell grab tab implemented on the inner surface of the containment wall shell, wherein the another shell grab tab is configured to matingly interlock with the another fitting grab notch on the another outer surface of the another pipe fitting to facilitate securing the containment wall shell to the another pipe fitting; and another containment wall seal integrated with the another shell grab tab on the containment wall shell of the supplemental containment wall assembly at least in part by covering the another shell grab tab with sealing material.

7. A method of implementing a pipeline system to provide multi-wall containment, comprising:
   implementing a supplemental containment wall assembly to be deployed at least at a pipe fitting in the pipeline system to include:
      a containment wall shell;
      a shell grab tab implemented circumferentially along an inner surface of the containment wall shell; and
      a containment wall seal integrated with the shell grab tab on the containment wall shell of the supplemental containment wall assembly at least in part by covering the shell grab tab with sealing material;
   circumferentially covering at least a portion of the pipe fitting using the containment wall shell, wherein the portion of the pipe fitting comprises a grab ring having a fitting grab notch that runs circumferentially along an outer surface of the pipe fitting; and
   securing the containment wall shell circumferentially around at least the portion of the pipe fitting at least in part by tightening one or more fasteners of the supplemental containment wall assembly such that:
      the shell grab tab on the inner surface of the containment wall shell matingly interlocks with the fitting grab notch on the outer surface of the pipe fitting; and
      a sealed fitting annulus is defined between at least the inner surface of the containment wall shell and the outer surface of the pipe fitting.

8. The method of claim 7, wherein:
   implementing the supplemental containment wall assembly comprises implementing a first clamp shell segment having a first threaded fastener opening and implementing a second clamp shell segment have a second threaded fastener opening;
   circumferentially covering at least the portion of the pipe fitting with the containment wall shell comprises disposing the first clamp shell segment and the second clamp shell segment around the pipe fitting such that the first threaded fastener opening in the first clamp shell segment is aligned with the second threaded fastener opening in the second clamp shell segment; and
   securing the containment wall shell circumferentially around at least the portion of the pipe fitting comprises tightening a threaded fastener in the first threaded fastener opening in the first clamp shell segment and the second threaded fastener opening in the second clamp shell segment such that the first clamp shell segment and the second clamp shell segment are forced toward one another.

9. The method of claim 7, wherein:
   implementing the supplemental containment wall assembly comprises implementing the supplemental containment wall assembly to include:
      a first other containment wall seal comprising a first O-ring seal or a first belt seal disposed circumferentially along the inner surface of the containment wall shell; and
      a second other containment wall seal comprising a second O-ring seal or a second belt seal disposed circumferentially along the inner surface of the containment wall shell;
   circumferentially covering at least the portion of the pipe fitting using the containment wall shell comprises:
      disposing the containment wall shell such that the first O-ring seal or the first belt seal radially overlaps with a first pipe segment to which the pipe fitting is secured; and
      disposing the containment wall shell such that the second O-ring seal or the second belt seal radially overlaps with a second pipe segment to which the pipe fitting is secured.

10. The method of claim 7, wherein:
   implementing the supplemental containment wall assembly comprises implementing the supplemental containment wall assembly to include:
      another shell grab tab implemented circumferentially along the inner surface of the containment wall shell; and
      another containment wall seal integrated with the another shell grab tab on the containment wall shell at least in part by covering the another shell grab tab with sealing material;
   circumferentially covering at least the portion of the pipe fitting using the containment wall shell comprises circumferentially covering another portion of another pipe fitting using the containment wall shell, wherein the another portion of the another pipe fitting comprises another grab ring having another grab notch that runs circumferentially along another outer surface of the another pipe fitting; and
   securing the containment wall shell circumferentially around at least the portion of the pipe fitting comprises securing the containment wall shell circumferentially around at least the another portion of the another pipe fitting such that:
      the another shell grab tab on the inner surface of the containment wall shell matingly interlocks with the another fitting grab notch on the another outer surface of the another pipe fitting; and
      the sealed fitting annulus is defined at least between the inner surface of the containment wall shell and the another outer surface of the another pipe fitting.

11. A supplemental containment wall assembly to be deployed in a pipeline system, comprising:
   a containment wall shell configured to be secured circumferentially around at least a pipe fitting in the pipeline system to facilitate defining a fitting annulus at least between an inner surface of the containment wall shell and an outer surface of the pipe fitting;
   a shell grab tab implemented circumferentially along the inner surface of the containment wall shell, wherein the shell grab tab is configured to matingly interlock with a fitting grab notch that runs circumferentially along the outer surface of the pipe fitting to facilitate securing the containment wall shell to the pipe fitting; and
   one or more containment wall seals implemented circumferentially along the inner surface of the containment wall shell, wherein:
      the one or more containment wall seals are configured to seal the fitting annulus defined at least between the containment wall shell and the pipe fitting to facilitate providing multi-wall containment at the pipe fitting in the pipeline system; and
      the one or more containment wall seals comprise a containment wall seal integrated with the shell grab tab on the containment wall shell of the supplemental containment wall assembly at least in part by covering the shell grab tab with sealing material.

12. The supplemental containment wall assembly of claim 11, wherein the containment wall shell comprises:
- a first clamp shell segment configured to be disposed around at least a first portion of the pipe fitting; and
- a second clamp shell segment configured to be disposed around at least second portion of the pipe fitting.

13. The supplemental containment wall assembly of claim 12, comprising a threaded fastener, wherein:
- the first clamp shell segment comprises a first threaded fastener opening;
- the second clamp shell segment comprises a second threaded fastener opening configured to be aligned with the first threaded fastener opening in the first clamp shell segment; and
- tightening the threaded fastener in the first threaded fastener opening in the first clamp shell segment and the second threaded fastener opening in the second clamp shell segment is configured to force the first clamp shell segment and the second clamp shell segment toward one another to facilitate securing the containment wall shell circumferentially around the pipe fitting.

14. The supplemental containment wall assembly of claim 11, wherein the one or more containment wall seals comprise:
- a first other containment wall seal comprising a first O-ring seal or a first belt seal disposed circumferentially along the inner surface of the containment wall shell such that the first O-ring seal or the first belt seal radially overlaps with a first pipe segment to which the pipe fitting is secured; and
- a second other containment wall seal comprising a second O-ring seal or a second belt seal disposed circumferentially along the inner surface of the containment wall shell such that the second O-ring seal or the second belt seal radially overlaps with a second pipe segment to which the pipe fitting is secured.

15. The supplemental containment wall assembly of claim 11, wherein:
- the containment wall shell is configured to be secured circumferentially around at least the pipe fitting and another pipe fitting;
- the supplemental containment wall assembly comprises another shell grab tab implemented circumferentially along the inner surface of the containment wall shell, wherein the another shell grab tab is configured to matingly interlock with another fitting grab notch that runs circumferentially along another outer surface of the another pipe fitting to facilitate securing the containment wall shell to the another pipe fitting; and
- the one or more containment wall seals comprise another containment wall seal integrated with the another shell grab tab on the containment wall shell of the supplemental containment wall assembly at least in part by covering the another shell grab tab with sealing material.

\* \* \* \* \*